United States Patent
Motohashi et al.

(10) Patent No.: US 10,272,334 B2
(45) Date of Patent: Apr. 30, 2019

(54) PROGRAM AND SYSTEM

(71) Applicant: KABUSHIKI KAISHA SQUARE ENIX, Tokyo (JP)

(72) Inventors: Daisuke Motohashi, Tokyo (JP); Kiminori Ono, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 121 days.

(21) Appl. No.: 15/459,425

(22) Filed: Mar. 15, 2017

(65) Prior Publication Data

US 2017/0266553 A1    Sep. 21, 2017

(30) Foreign Application Priority Data

Mar. 16, 2016 (JP) .................................. 2016-052178

(51) Int. Cl.
| | |
|---|---|
| *A63F 13/52* | (2014.01) |
| *A63F 13/35* | (2014.01) |
| *A63F 13/573* | (2014.01) |
| *A63F 13/847* | (2014.01) |
| *A63F 13/812* | (2014.01) |

(52) U.S. Cl.
CPC ............ *A63F 13/35* (2014.09); *A63F 13/573* (2014.09); *A63F 13/812* (2014.09); *A63F 13/847* (2014.09)

(58) Field of Classification Search
CPC ...... A63F 13/35; A63F 13/573; A63F 13/812; A63F 13/847
USPC .......................................................... 463/31
See application file for complete search history.

(56) References Cited

U.S. PATENT DOCUMENTS

| | | | |
|---|---|---|---|
| 8,337,300 B2* | 12/2012 | Bowers | G07F 17/32 463/25 |
| 2015/0031451 A1* | 1/2015 | Murakami | A63F 13/00 463/31 |
| 2015/0246284 A1 | 9/2015 | Taoka et al. | |

FOREIGN PATENT DOCUMENTS

| | | |
|---|---|---|
| JP | 2013-118887 | 6/2013 |
| JP | 2013-202218 | 10/2013 |
| JP | 2014-068720 | 4/2014 |

(Continued)

OTHER PUBLICATIONS

Office Action from Japan Patent Office (JPO) in Japanese Patent Appl. No. 2016-052178, dated Jan. 31, 2017, together with an English language translation.

*Primary Examiner* — Allen Chan

(74) *Attorney, Agent, or Firm* — Greenblum & Bernstein, P.L.C.

(57) ABSTRACT

A non-transitory computer-readable medium including a program causing a user terminal to realize functions to control progress of a video game is provided. The functions include: a receiving function configured to receive participation of a user of the user terminal in an event, a plurality of users being allowed to participate in the event, the event proceeding in synchronization with participating users who participate in the event; a displaying function causing the user terminal to display a game image, the game image containing a game field unique to the user; and a progress controlling function controlling progress of the event in which at least a part of an enemy character appears in a game field unique to at least one user of the participating users, the progress controlling function controlling progress of the event in the game field unique to the user in accordance with an input of the user.

14 Claims, 12 Drawing Sheets

(56) References Cited

FOREIGN PATENT DOCUMENTS

JP     2016-192987     11/2016

\* cited by examiner

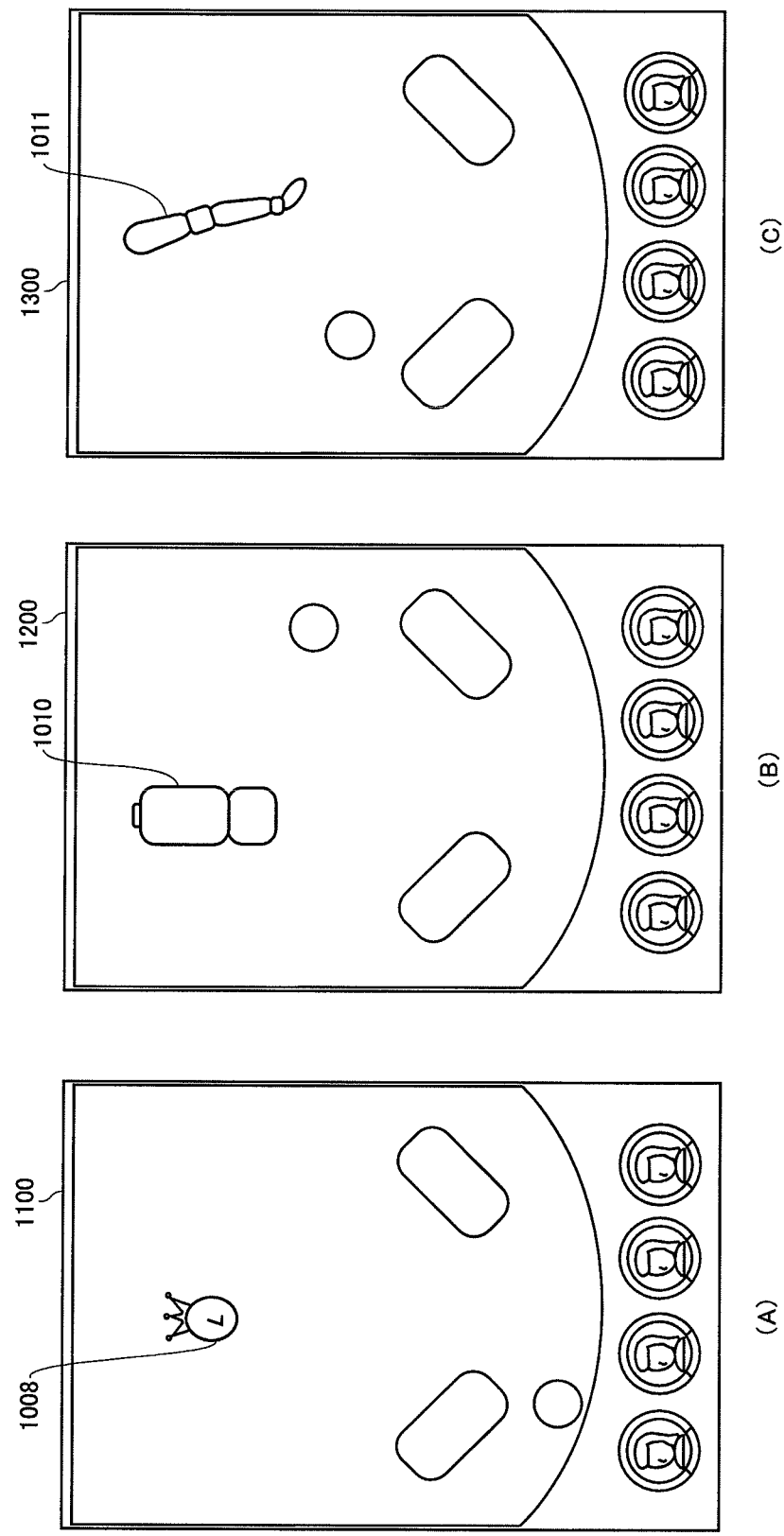

PROGRAM AND SYSTEM

CROSS-REFERENCE TO RELATED APPLICATION

The present application relates to subject matter contained in Japanese Patent Application No. 2016-52178 field on Mar. 16, 2016, the disclosure of which is expressly incorporated herein by reference in its entirety.

BACKGROUND OF THE INVENTION

1. Field of the Invention

At least one of embodiments according to the present invention relates to a non-transitory computer-readable medium including a program and a system for causing a user terminal to realize functions to control progress of a video game, and a non-transitory computer-readable medium including a program for causing a server to realize functions to control progress of a video game.

2. Description of the Related Art

In conventional systems, there is a game system in which a video game is caused to proceed by a plurality of players.

In such a system, for example, there is a video game system configured to cause a plurality of players to share a common event game in real time (see Japanese Patent Application Publication No. 2014-068720).

However, such a system normally creates a state where each of users who participate in an event is positioned in the same virtual game space, and causes the event to proceed in the virtual game space. For that reason, there has been a problem that in a case where there is one stronger user among users who participate in an event, for example, a degree of importance (or priority) of play of users other than the user reduces and interest in or the taste of the video game thus reduces. Therefore, in the conventional video game system, there has been a room for improvement of the interest in or the taste of a video game using real time communication.

SUMMARY OF THE INVENTION

It is an object of at least one of embodiments according to the present invention to solve the problem described above, and to improve interest in or the taste of a video game using real time communication.

According to one non-limiting aspect of one embodiment of the present invention, there is provided a non-transitory computer-readable medium including a program product for causing a user terminal to realize functions to control progress of a video game.

The functions include a receiving function configured to receive participation of a user of the user terminal in an event, a plurality of users being allowed to participate in the event, the event proceeding in synchronization with participating users who participate in the event.

The functions also include a displaying function configured to cause the user terminal to display a game image, the game image containing a game field unique to the user.

The functions also include a progress controlling function configured to control progress of the event in which at least a part of an enemy character appears in a game field unique to at least one user of the participating users, the enemy character being associated with the event, the progress controlling function being configured to control progress of the event in the game field unique to the user in accordance with an input of the user.

According to another non-limiting aspect of one embodiment of the present invention, there is provided a system for controlling progress of a video game. The system includes a communication network, a server, and a user terminal.

The system includes a receiving section configured to receive participation of a user of the user terminal in an event, a plurality of users being allowed to participate in the event, the event proceeding in synchronization with participating users who participate in the event.

The system also includes a displaying section configured to cause the user terminal to display a game image, the game image containing a game field unique to the user.

The system also includes a progress control section configured to control progress of the event in which at least a part of an enemy character appears in a game field unique to at least one user of the participating users, the enemy character the enemy character being associated with the event, the progress control section being configured to control progress of the event in the game field unique to the user in accordance with an input of the user.

According to still another non-limiting aspect of one embodiment of the present invention, there is provided a non-transitory computer-readable medium including a program product for causing a server to realize functions to control progress of a video game.

The functions include a receiving function configured to receive participation of a user of a user terminal in an event, a plurality of users being allowed to participate in the event, the event proceeding in synchronization with participating users who participate in the event.

The functions also include a displaying function configured to cause the user terminal to display a game image, the game image containing a game field unique to the user.

The functions also include a progress controlling function configured to control progress of the event in which at least a part of an enemy character appears in a game field unique to at least one user of the participating users, the enemy character being associated with the event, the progress controlling function being configured to control progress of the event in the game field unique to the user in accordance with an input of the user.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings:

FIG. 21 is an explanatory drawing for explaining an example of the display screen corresponding to at least one of the embodiments according to the present invention.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like did not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like did not occur in the content of the processing.

First Embodiment

Figure 1:
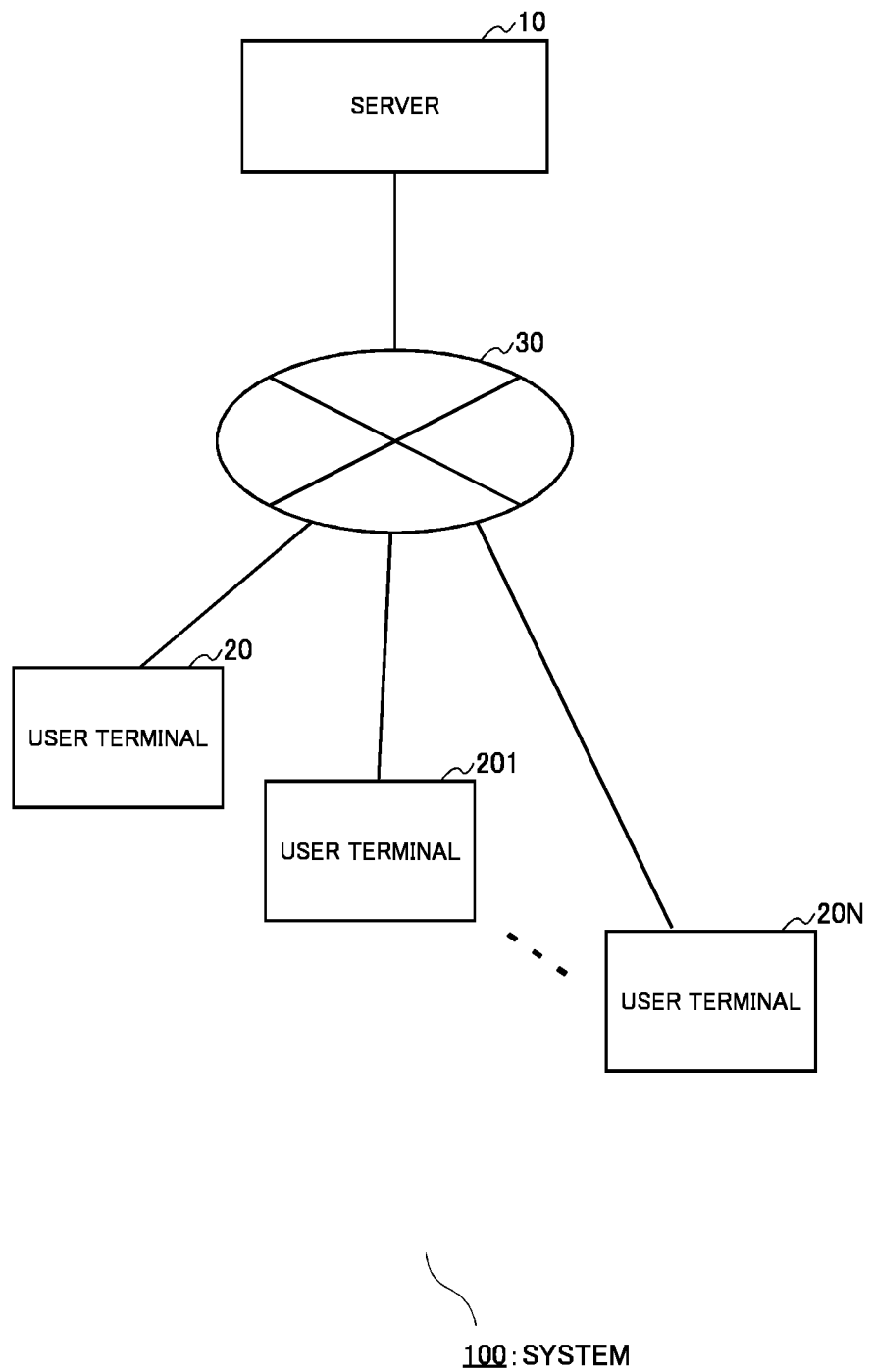
FIG. 1 is a block diagram showing an example of a configuration of a system corresponding to at least one of embodiments according to the present invention.

FIG. 1 is a block diagram showing an example of a configuration of a system 100 according to one embodiment of the present invention. As shown in FIG. 1, the system 100 includes a server 10 and a plurality of user terminals 20 and 201 to 20N ("N" is an arbitrary integer), each of which is used by a user of the system. In this regard, a configuration of the system 100 is not limited to this configuration. The system 100 may be configured so that a plurality of users uses a single user terminal, or may be configured so as to include a plurality of servers.

Each of the server 10 and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The system 100 includes the server 10 and the plurality of user terminals 20, 201 to 20N, whereby various kinds of functions for carrying out various kinds of processes in response to an operation of the user are realized.

The server 10 is managed by an administrator of the system 100, and has various kinds of functions to provide information regarding the various kinds of processes to the plurality of user terminals 20, 201 to 20N. In the present embodiment, the server 10 is constructed by an information processing apparatus, such as a WWW server, and includes a storage medium for storing various kinds of information. In this regard, the server 10 is provided with a general configuration for carrying out the various kinds of processes, such as a control section and a communicating section, as a computer. However, its explanation herein is omitted. Further, in the system 100, it is preferable that the server 10 manages various kinds of information from a point of view to reduce a processing load on each of the plurality of user terminals 20, 201 to 20N. However, a storage region may be provided in a state that the server 10 can access the storage region. For example, the server 10 may be configured so as to be provided with a dedicated storage region outside the server 10.

Figure 2:
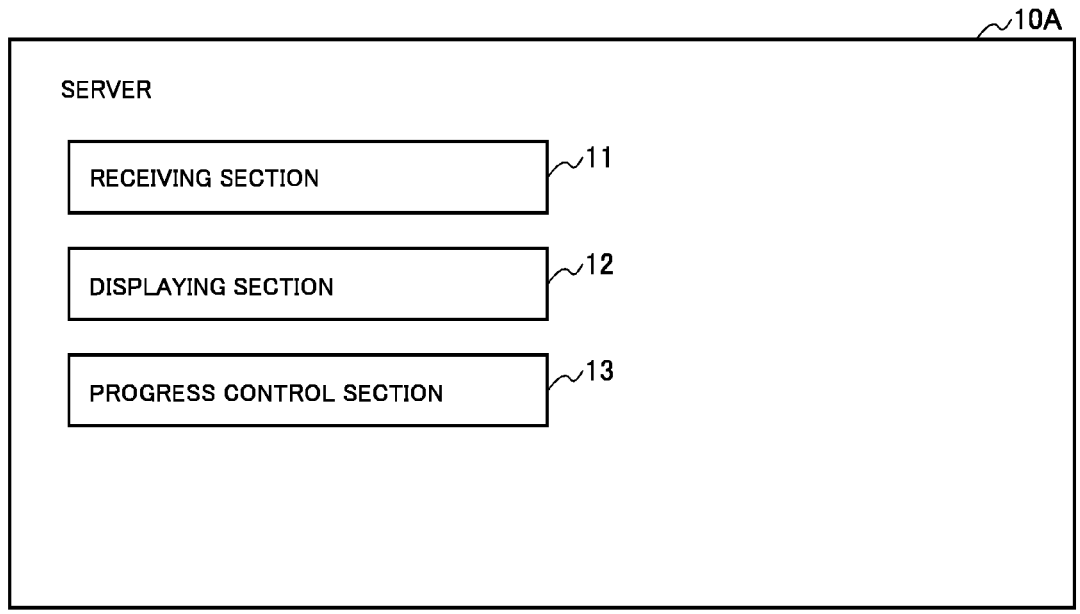
FIG. 2 is a block diagram showing a configuration of a server corresponding to at least one of the embodiments according to the present invention.

FIG. 2 is a block diagram showing a configuration of a server 10A, which is an example of the configuration of the server 10. As shown in FIG. 2, the server 10A at least includes a receiving section 11, a displaying section 12, and a progress control section 13.

The receiving section 11 has a function to receive participation of a user of the user terminal 20 in an event.

Here, the event means an event or occurrence that can occur in a video game. In the present embodiment, the event is configured so that a plurality of users are allowed to participate therein and the event proceeds in synchronization with users who participate therein (hereinafter, referred to as "participating users"). The concrete configuration of the event is not limited particularly. However, for example, there is a configuration in which a fight between a plurality of users and one enemy character is carried out in the video game. Further, the event may be configured so that two or more enemy characters appear in the video game and at least one enemy character of the two or more enemy characters is a special character.

Further, the fight means game content in which a user and an enemy character are caused to fight (or compete) with each other on the basis of a program stored in a predetermined storage region. As one example of the fight, there are a Raid Battle, and the like.

Further, the phrase "in synchronization with" means that part of content and information is caused to coincide with each other. It is preferable that operation results of the plurality of users are displayed on a display screen of each of the users in real time. The synchronization mentioned herein includes synchronization in the sense of a state that the event is completely synchronized in the respective user terminals, and synchronization in the sense of a state that part of information (for example, the minimum game content) is communicated among the respective user terminals.

Further, the word "progress of the event" means occurrence of various kinds of progress or changes and the like that can be generated in the event. As one example of the phrase "occurrence of various kinds of progress or changes and the like that can be generated in the event", there are progress of time, a change in a parameter of a game element, update of a specific status or a flag, or an operational input by the user, and the like.

The displaying section 12 has a function to cause a display device to display a game image, which contains a game field unique to the user, on a display screen.

Here, the game field means a fixed area that is set up for progress of the event. The game field is configured so as to be unique to a user who participate in the event.

Further, the phrase "unique to" means that one exists only for the user. For example, it is preferable that the system 100 is configured so as to include a game field A unique to a user A and a game field B unique to a user B in a case where the user A and the user B participate in an event. The system 100 may be configured so that a game field for other user is displayed. Here, as an example of the event that proceeds in synchronization with a plurality of users each of which has a unique game field, there is a configuration in which information regarding an event, such as an elapsed time, an enemy character that appears in the event, and a clear condition is synchronized among the participating users.

Further, the phrase "cause the display device to display an image on the display screen" means causing each of the user terminals 20, 201 to 20N to output an image on the display device included therein by means of communication using the communication network 30. As an example of the configuration to cause the display device to display an image, there is a configuration in which information (image information) generated at a server side is transmitted to each side of the user terminals 20, 201 to 20N. In this regard, the configuration of the image information is not limited particularly. For example, the image information may be information in which an image is compressed, or information for causing each side of the user terminals 20, 201 to 20N to generate an image. As an example of the information in which an image is compressed, there is one used in a cloud game (for example, MPEG). Further, as an example of the information for causing each side of the user terminals 20, 201 to 20N to generate an image, there is one used in an online game (for example, positional information).

The progress control section 13 has a function to control progress of the event in which at least a part of an enemy character associated with the event appears in a game field unique to at least one user of the participating users, and to control progress of the event in the game field unique to the user in accordance with an input of the user.

Here, the phrase "at least apart of an enemy character" means parts of the enemy character that is constituted by a plurality of parts. For example, the enemy character is configured so as to include a face, a body, a hand, and a foot. Each of the face, the body, the hand, and the foot corresponds to at least a part of the enemy character. Further, at least the part of the enemy character may be configured so that each of the face, the body, the hand, and the foot is divided into a plurality of portions. For example, at least the part of the enemy character may be configured so as to be one part or two or more parts of the foot that is divided into four parts.

Further, the word "appear" means that one comes out. The configuration to cause at least a part of the enemy character to appear in the game field is not limited particularly. However, for example, it may be configured so that an object that is to appear is newly displayed in the game image. Alternatively, it may be configured so that an object that is to appear is displayed in the game image in an invisible mode, and the object is then displayed in the game image in such a manner that an invisible one appears (or shows itself).

Each of the plurality of user terminals 20, 201 to 20N is managed by a user, and is configured by a communication terminal, such as a cellular phone terminal, a PDA (Personal Digital Assistants), a mobile game device, and a so-called wearable divide, by which the user can play a network delivery type video game, for example. In this regard, a configuration of the user terminal that the system 100 can include is not limited to the examples described above. It may be a configuration in which the user can recognize the video game. As other examples of the user terminal, there are a combination of various kinds of communication terminals, a personal computer, and a stationary game device.

Further, each of the plurality of user terminals 20, 201 to 20N is connected to the communication network 30, and includes hardware (for example, a display device for displaying a game image) and software for carrying out various kinds of processing by communicating with the server 10. In this regard, each of the plurality of user terminals 20, 201 to 20N may be configured so as to be capable of directly communicating with each other without the server 10.

Next, an operation of the system 100 according to the present embodiment will be described.

Figure 3:
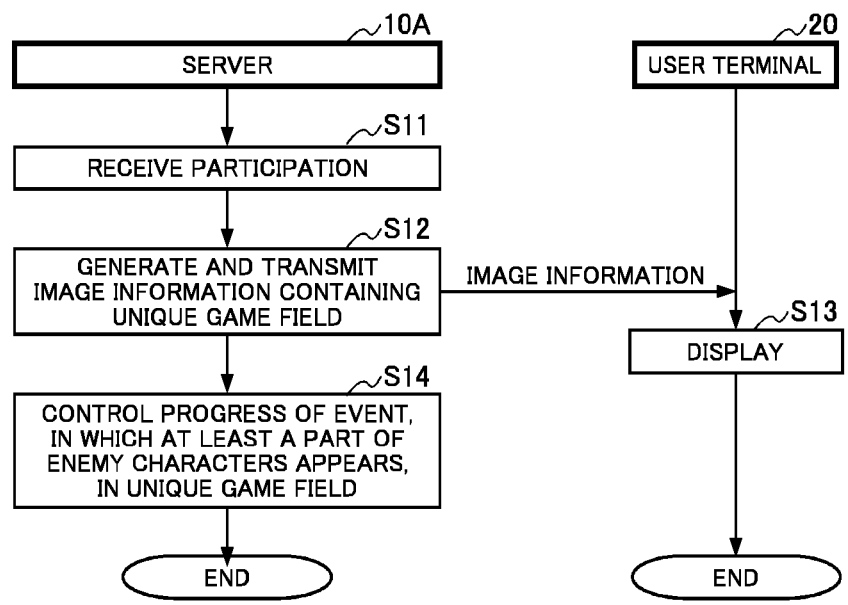
FIG. 3 is a flowchart showing an example of game related processing corresponding to at least one of the embodiments according to the present invention.

FIG. 3 is a flowchart showing an example of processing regarding a video game carried out by the system 100 (hereinafter, referred to as "game related processing"). In the game related processing according to the present embodiment, processing to cause an event to proceed is carried out. Hereinafter, the case where the server 10A and the user terminal 20 (hereinafter, referred to as the "terminal 20") carry out the game related processing will be described as an example.

In the game related processing, the server 10A first receives participation in an event (Step S11). For example, the server 10A receives, from the terminal 20, information that means participation in an event, and receives participation of the user in the event.

Subsequently, the server 10A generates image information for causing the terminal 20 to display a game image, which contains a game field unique to the user, and transmits the generated image information to the terminal 20 (Step S12). Namely, the server 10A causes the terminal 20 to display the game image that contains the game field unique to the user.

The terminal 20 causes the display device to display the game image on the display screen on the basis of the received image information (Step S13).

Subsequently, the server 10A controls progress of the event in which at least a part of the enemy character associated with the event appears in a game field unique to at least one user of participating users, and controls the progress of the event in the game field unique to the user in accordance with the input of the user (Step S14). For example, the server 10A receives information regarding an operation result of the user in the event (hereinafter, referred to as "operation result information") from the terminal 20, and receives operation result information of a user other than the user of the participating users (hereinafter, referred to as "other participating user") from a terminal of each of other participating users, whereby the server 10A controls progress of the event.

When progress of the event is controlled, the system 100 terminates the processing herein.

Figure 4:
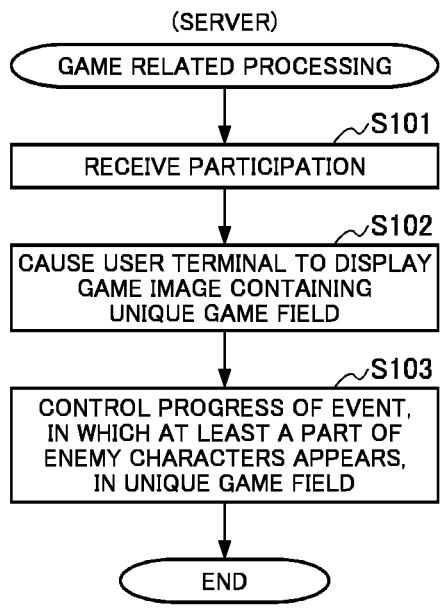
FIG. 4 is a flowchart showing an example of an operation of a server side in the game related processing corresponding to at least one of the embodiments according to the present invention.

FIG. 4 is a flowchart showing an example of an operation of the server 10A side in the game related processing. Here, an operation of the server 10A according to the system 100 will be described again.

In the game related processing, the server 10A first receives participation in an event (Step S101). Subsequently, the server 10A causes the terminal 20 to display a game image containing the game field unique to the user (Step S102). For example, the server 10A generates the image information for causing the display device to display the game image containing the game field unique to the user, and transmits the generated image information to the terminal 20. Subsequently, the server 10A controls progress of the event in which at least a part of the enemy character, which is associated with the event, appears in the game field unique to at least one user of the participating users, and controls progress of the event in the game field unique to the user in accordance with an input of the user (Step S103).

Figure 5:
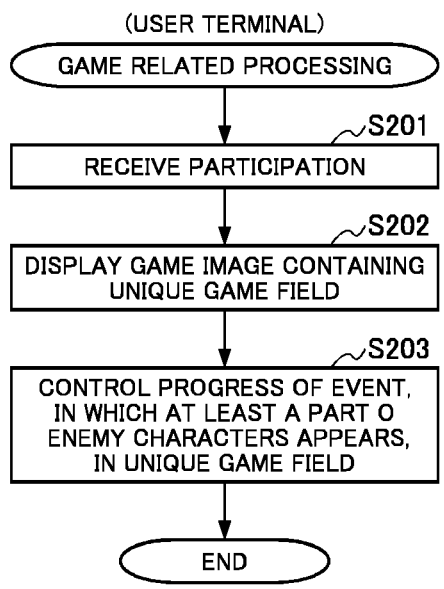
FIG. 5 is a flowchart showing an example of an operation of a terminal side in the game related processing corresponding to at least one of the embodiments according to the present invention.

FIG. 5 is a flowchart showing an example of an operation of the terminal 20 side in a case where the terminal 20 carries out the game related processing. Hereinafter, the case where the terminal 20 carries out the game related processing by a single body will be described as an example. In this regard, the terminal 20 is configured so as to include the similar functions to those of the server 10 except for reception of various kinds of information from the server 10. For this reason, its description is omitted from a point of view to avoid repeated explanation.

In the game related processing, the terminal 20 first receives participation in an event (Step S201). Subsequently, the terminal 20 causes the display device to display a game image containing a game field unique to the user (Step S202). For example, the terminal 20 generates image information for displaying the game image, and causes the display device included therein to display the game image on the display screen on the basis of the generated image information. Subsequently, the terminal 20 controls progress of the event in which at least a part of the enemy character, which is associated with the event, appears in the game field unique to at least one user of the participating users, and controls progress of the event in the game field unique to the user in accordance with an input of the user (Step S203).

As explained above, as one side of the first embodiment, the server 10A for controlling progress of the video game is configured so as to include the receiving section 11, the displaying section 12, and the progress control section 13. Thus, the receiving section 11 receives the participation of the user of the terminal 20 in the event that the plurality of users are allowed to participate in and proceeds in synchronization with the participating users who participate in the event; the displaying section 12 causes the display device of the terminal 20 to display the game image containing the game field unique to each of the participating users; and the progress control section 13 controls progress of the event in which at least a part of the enemy character, which is associated with the event appears in the game field unique to at least one user of the participating users, and controls progress of the event in the game field unique to the user in accordance with the input of the user. Therefore, it becomes possible to improve interest in or the taste of the video game using real time communication.

Namely, as one side of the first embodiment, at least apart of the enemy character is displayed on the display device of the user terminal of any one participating user of the participating users. For this reason, it becomes possible to improve the degree of importance (or priority) of play of each of the participating users in a form that has not been around until now. For that reason, it becomes possible to improve interest in or the taste of the video game using real time communication. Further, as one side of the first embodiment, it becomes possible to apply a different status to each of the users in real time while causing each of the users to share a common event game in real time. For this reason, it becomes possible to improve interest in or the taste of the video game using real time communication.

In this regard, it has not been mentioned particularly in the example of the first embodiment. However, the server 10A may be configured so as to: generate appearance information for causing at least a part of the enemy character associated with the event to appear in a game field of at least one user of the participating users; and control progress of the event on the basis of the appearance information.

In this regard, it has not been mentioned particularly in the example of the first embodiment. However, the server 10A may be configured so as to: generate the appearance information, which contains parts information and appearance user information, in accordance with a predetermined rule, the parts information being related to an appearance portion of the enemy character, the appearance user information meaning the participating user who causes the display device to display the appearance portion; and transmit the parts information to a user terminal of the participating user indicated by the appearance user information. In this regard, the server 10A may be configured so as to transmit the appearance information to all of the participating users.

In this regard, it has not been mentioned particularly in the example of the first embodiment. However, the server 10A may be configured so as to: receive operation result information of the other participating user from each of the terminals of the other participating users; store event information containing information regarding the enemy character in a predetermined storage region; refer to an input of the user and the operation result information to update the event information; and refer to the updated event information to generate the appearance information.

In this regard, it has not been mentioned particularly in the example of the first embodiment. However, it is preferable that the server 10A is configured so as to have a function to cause the display device to display information regarding progress of the event controlled by the progress control section 13 on the display screen. Namely, it is preferable that the server 10A is configured so as to transmit, to each of the terminals 20, 201 to 20N, image information for causing the display device to display an image, by which the user is caused to recognize information regarding progress of the event, on the display screen.

Second Embodiment

Figure 6:
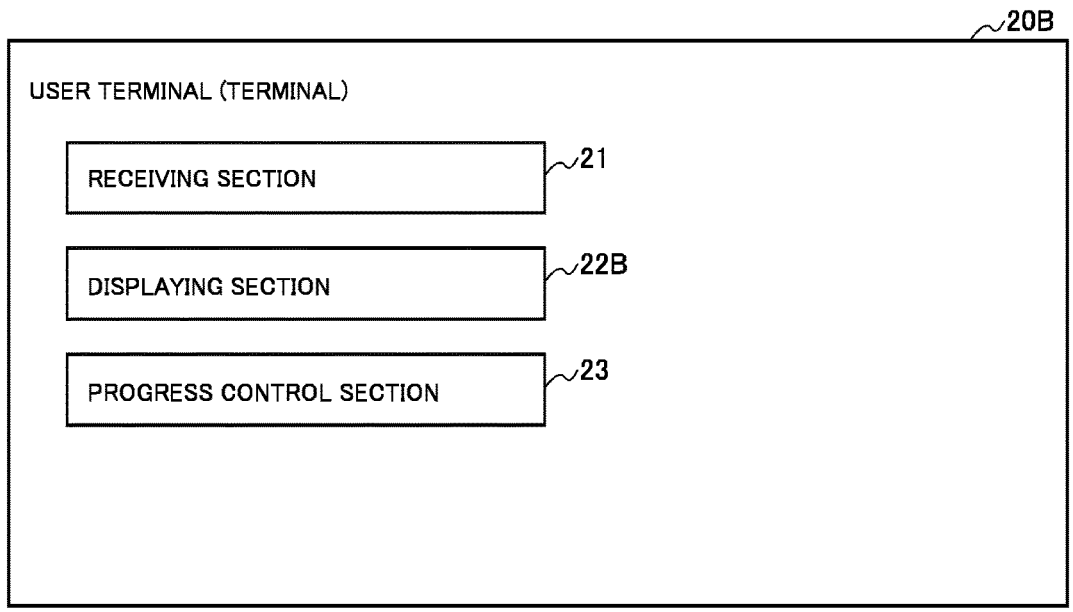
FIG. 6 is a block diagram showing a configuration of a user terminal corresponding to at least one of the embodiments according to the present invention.

FIG. 6 is a block diagram showing a configuration of a user terminal 20B (hereinafter, referred to as a "terminal 20B"), which is an example of the user terminal 20. In the present embodiment, the terminal 20B at least includes a receiving section 21, a displaying section 22B, and a progress control section 23.

The displaying section 22B has a function to display a game field unique to a user for which display restriction of a moving object operated by other user (hereinafter, referred to as "other participating user") of users who participate in the same event (hereinafter, referred to as "participating users") than the user of the terminal 20B is imposed.

Here, the moving object means an object that is configured so as to move on a game field unique to each of the participating users. The configuration of the moving object is not limited particularly so long as the moving object can become an operation target of the user. As examples of the moving object operated by the user, there are a moving object formed by a spherical body, a moving object formed by a figure or appearance of a character, and the like.

Further, the phrase "operated by the user" includes the case where the moving object is directly operated by the user and the case where the moving object is indirectly operated by the user. The case where the moving object is directly operated by the user includes the case where a moving object Z operates by an input against the moving object Z in a case where a moving object directly operated is the moving object Z. Further, the case where the moving object is indirectly operated by the user includes the case where a moving object Y operates in accordance with the moving object Z directly operated in a case where a moving object operated indirectly is the moving object Y.

Further, the display restriction means that display of an object is restricted. Namely, the displaying section 22 is configured so that any moving object operated is not displayed in a game field operated by other participating user while the display restriction is imposed. In other words, the displaying section 22 is configured so as to display the game field (that is, the game field unique to the user) in which any moving object operated by the other participating user does not exist.

Figure 7:
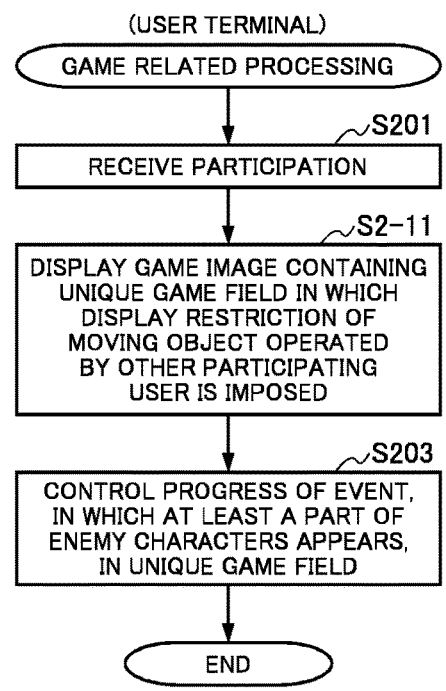
FIG. 7 is a flowchart showing an example of the game related processing corresponding to at least one of the embodiments according to the present invention.

FIG. 7 is a flowchart showing an example of the game related processing carried out by the terminal 20. Hereinafter, an operation of the terminal 20B will be described as an example. In this regard, an operation of the terminal 20B together with the server 10 is omitted from a point of view to avoid repeated explanation.

When participation in an event is received (Step S201), the terminal 20B causes a display device to display a game field unique to the user for which display restriction of any moving object operated by other participating users is imposed (Step S2-11).

As explained above, as one side of the second embodiment, the user terminal 20B is configured so as to include the receiving section 21, the displaying section 22B, and the progress control section 23. Thus, the displaying section 22B displays the game field unique to the user for which the display restriction of the moving object operated by any other user (the other participating user) of the users who participate in the same event (the participating users) than the user of the terminal 20B is imposed. Therefore, it becomes possible to heighten a degree of importance (or priority) of play of each of the participating users in one event game that is carried out using real time communication, and it becomes possible to improve interest in or the taste of the video game using real time communication.

In this regard, it has not been mentioned particularly in the example of the second embodiment. However, it is preferable that the progress control section 23 is configured so as to control progress of the event in the game field unique to the user displayed by the displaying section 22B.

Third Embodiment

Figure 8:
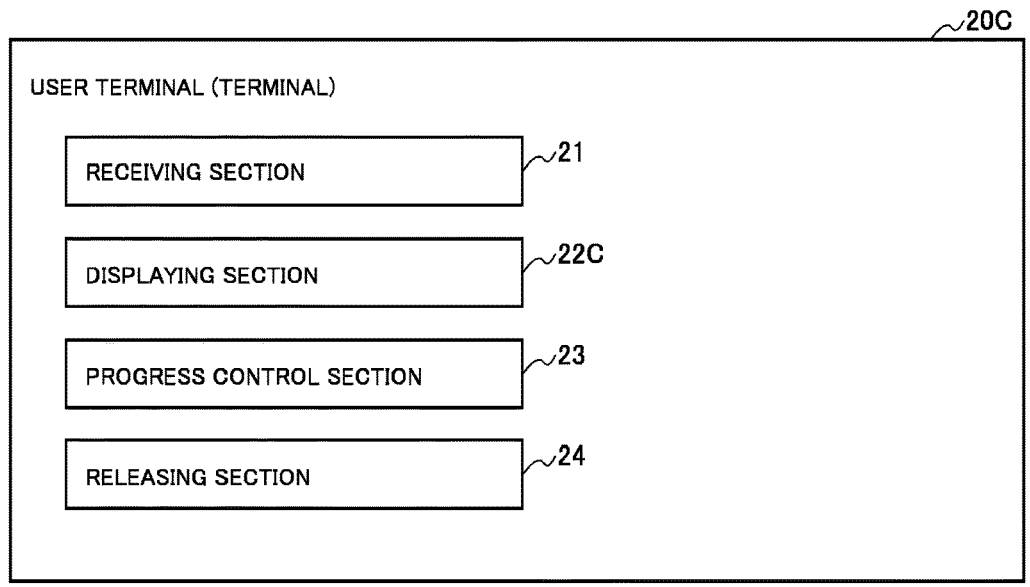
FIG. 8 is a block diagram showing a configuration of the user terminal corresponding to at least one of the embodiments according to the present invention.

FIG. 8 is a block diagram showing a configuration of a user terminal 20C (hereinafter, referred to as a "terminal 20C"), which is an example of the user terminal 20. In the present embodiment, the terminal 20C at least includes a receiving section 21, a displaying section 22C, a progress control section 23, and a releasing section 24.

The releasing section 24 has a function to release display restriction in a case where a predetermined condition is satisfied.

Here, the predetermined condition means a condition that is defined in advance. The configuration of the predetermined condition is not limited particularly. As an example of the configuration of the predetermined condition, there is a configuration in which a point that is accumulated in accordance with progress of an event is accumulated to a predetermined value.

Further, the phrase "release display restriction" means that the game field unique to the user in which a moving object operated by other participating user is displayed. For example, by releasing the display restriction, a moving object operated by other participating user B is displayed in the game field unique to the user A. In other words, by releasing the display restriction, cooperative play in the game field unique to the user A becomes possible.

Figure 9:
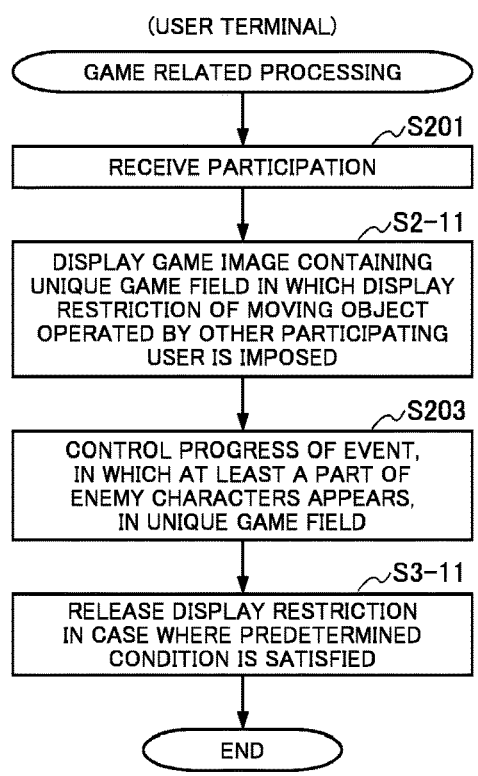
FIG. 9 is a flowchart showing an example of the game related processing corresponding to at least one of the embodiments according to the present invention.

FIG. 9 is a flowchart showing an example of the game related processing carried out by the terminal 20. Hereinafter, an operation of the terminal 20C will be described as an example. In this regard, an operation of the terminal 20C together with the server 10 is omitted from a point of view to avoid repeated explanation.

The terminal 20C causes a display device to display a game field for which display restriction of a moving object is imposed (Step S2-11), and controls progress of the event (Step S203). In a case where a predetermined condition is satisfied, the terminal 20C releases the display restriction (Step S3-11).

The terminal 20C then controls progress of the event in the game field in which the display restriction is released, and terminates the processing herein.

As explained above, as one side of the third embodiment, the user terminal 20C is configured so as to include the receiving section 21, the displaying section 22C, the progress control section 23, and the releasing section 24. Thus, the releasing section 24 releases the display restriction in a case where the predetermined condition is satisfied. Therefore, it becomes possible to improve interest in or the taste of the video game using real time communication.

In this regard, it has not been mentioned particularly in the example of the third embodiment. However, the user terminal 20C may be configured so as to determine whether the release display restriction is imposed again or not. By configuring the user terminal 20C in this manner, it becomes possible to modulate progress of the video game, and it becomes possible to improve interest in or the taste of the video game using real time communication.

Fourth Embodiment

Figure 10:
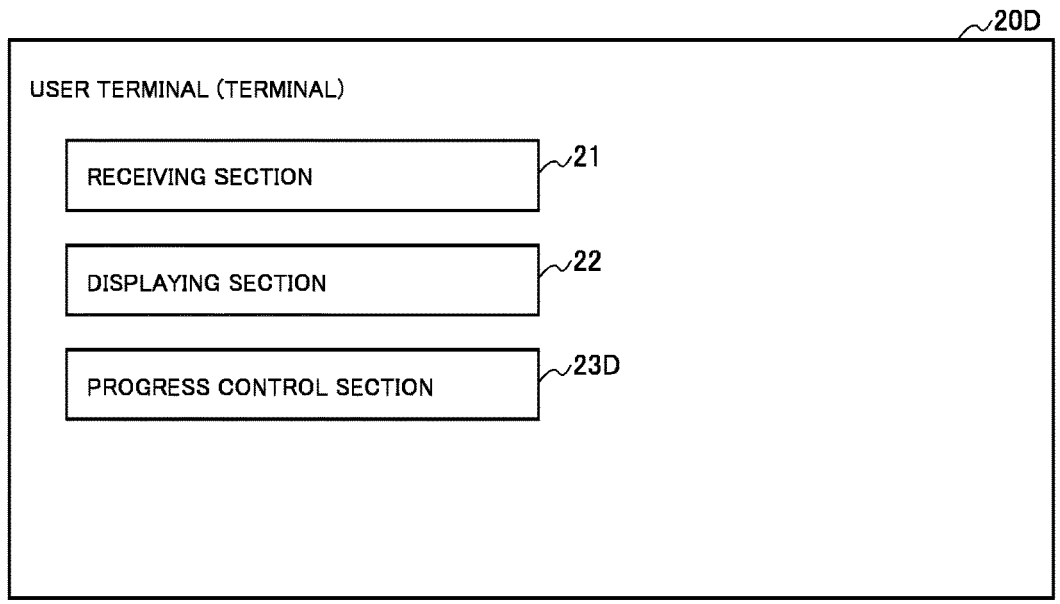
FIG. 10 is a block diagram showing a configuration of the user terminal corresponding to at least one of the embodiments according to the present invention.

FIG. 10 is a block diagram showing a configuration of a user terminal 20D (hereinafter, referred to as a "terminal 20D"), which is an example of the user terminal 20. In the present embodiment, the terminal 20D at least includes a receiving section 21, a displaying section 22, and a progress control section 23D.

The progress control section 23D has a function to control progress of an event on the basis of user information of each of participating users. In the event, at least a part of an enemy character appears in a game field unique to each of the participating users. The part of the enemy character is a portion that is assigned to each of the participating users.

Here, the user information means information regarding the user. The configuration of the user information is not limited particularly. However, it is preferable that the user information is configured so as to contain overall information related to the user, such as a level, an HP, and an evaluation value of the user.

Further, the word "assigned to" means that the whole is divided and assigned to each of the participating users. In the present embodiment, portions into which one enemy character is divided (hereinafter, referred to as "parts") are respectively assigned to the participating users. For example, a foot is assigned to a user A, an arm is assigned to a user B, and a body is assigned to a user C. In case of assigning them in this manner, the foot of the enemy character is displayed in a game field unique to the user A. Further, the arm of the enemy character is displayed in a game field unique to the user B. Further, the body of the enemy character is displayed in a game field unique to the user C.

In this regard, the progress control section 23D may be configured so that all of the divided parts are assigned to the participating users. However, the progress control section 23D may be configured so that some of the divided parts are assigned to some of the participating users. Furthermore, the progress control section 23D may be configured so that a part of the parts (for example, in a case where an enemy character has eight feet, two feet of the eight feet) is assigned to any of the participating users.

Figure 11:
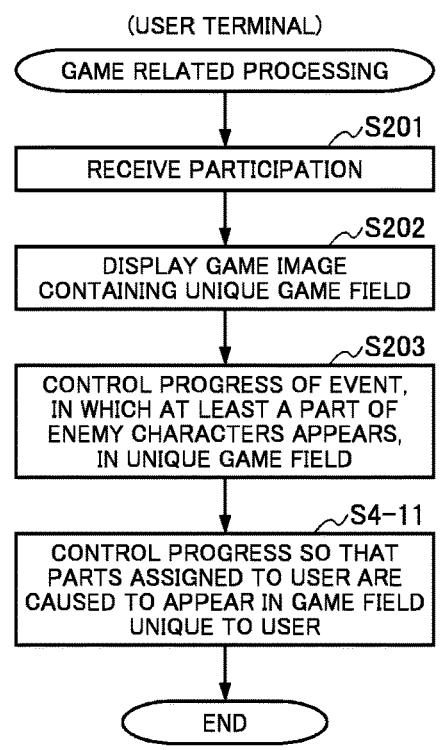
FIG. 11 is a flowchart showing an example of the game related processing corresponding to at least one of the embodiments according to the present invention.

FIG. 11 is a flowchart showing an example of the game related processing carried out by the terminal 20. Hereinafter, an operation of the terminal 20D will be described as an example. In this regard, an operation of the terminal 20D together with the server 10 is omitted from a point of view to avoid repeated explanation.

When the terminal 20D controls progress of an event (Step S203), the terminal 20D controls progress of the event in which parts assigned to the user of the terminal 20D are caused to appear in the game field unique to the user of the terminal 20D on the basis of the user information (Step S4-11), and terminates the processing herein.

As explained above, as one side of the fourth embodiment, the user terminal 20D is configured so as to include the receiving section 21, the displaying section 22, and the progress control section 23D. Thus, the progress control section 23D controls progress of the event in which at least a part of the enemy character, which is a portion assigned to each of the participating users, appears in the game field unique to each of the participating users on the basis of the user information of each of the participating users. Therefore, it becomes possible to adjust a quality of the video game and/or a degree of difficulty of the video game in accordance with information related to the user who participates in the event. For this reason, it becomes possible to improve interest in or the taste of the video game using real time communication.

In this regard, it has not been mentioned particularly in the example of the fourth embodiment. However, the user terminal 20D may be configured so as to determine whether to assign apart of the enemy character in accordance with progress of the video game multiple times or not. By configuring the user terminal 20D in this manner, it becomes possible to constitute various kinds of development, and it becomes possible to improve interest in or the taste of the video game using real time communication.

In this regard, it has not been mentioned particularly in the example of the fourth embodiment. However, the user terminal 20D may be configured so as to include a first function to assign parts, which are caused to always display, to a game field unique to each of the participating users and a second function to assign parts, which are caused to display for a fixed time, to the game field unique to each of the participating users. By configuring the user terminal 20D in this manner, it becomes possible to further improve a degree of importance (or priority) of play of each of the participating users. For this reason, it becomes possible to improve interest in or the taste of the video game using real time communication.

In this regard, it has not been mentioned particularly in the example of the fourth embodiment. However, it is preferable that each of the parts further includes an HP, and each of the parts that are caused to always display is configured to include a predetermined reference value. In this case, it is preferable that the user terminal 20D is configured so as to determine whether a total of damages applied to the parts that are caused to always display satisfies the predetermined reference value or not and whether a total of damages applied to all of the parts reaches a value, by which the HP of an enemy becomes zero, or not when the user terminal 20D determines whether a condition that "the HP of the enemy character becomes zero", which is a condition to terminate the event, is satisfied or not. Namely, it becomes possible to impose a hurdle (or difficulty) on the participating user so that each of the participating users has to clear the condition in an individual level. For this reason, it becomes possible to further improve a degree of importance (or priority) of play of each of the participating users, and it becomes possible to improve interest in or the taste of the video game using real time communication.

In this regard, it has not been mentioned particularly in the example of the fourth embodiment. However, the user terminal 20D may be configured so that a part according to a level value of each of the participating users is assigned to each of the participating users. Namely, the user terminal 20D may be configured so as to control progress of the event in which the part assigned to each of the participating users in accordance with the level value appears in the game field unique to each of the participating users on the basis of the level value of each of the participating users. By configuring the user terminal 20D in this manner, it becomes possible to adjust a quality of the video game and/or a degree of difficulty of the video game in accordance with the information related to the user who participates in the event. For this reason, it becomes possible to improve interest in or the taste of the video game using real time communication. In this regard, the level value is not limited to the level value of each of the participating users. The level value may be a level value of each of the characters that participate in the event. Further, the level value is stored in a predetermined storage region associated with each of the participating users, and the user terminal 20D refers to the predetermined storage region to specify the level value. Further, the user terminal 20D may be configured so that information in which the part and the level value are associated with each other is stored in the storage region.

In this regard, it has not been mentioned particularly in the example of the fourth embodiment. However, the user terminal 20D may be configured so that the part according to the evaluation value of each of the participating users is assigned to each of the participating users. Namely, the user terminal 20D may be configured so as to control progress of the event, in which the part assigned to each of the participating user in accordance with the evaluation value appears in the game field unique to each of the participating users, on the basis of the evaluation value of each of the participating users according to progress of the video game. By configuring the user terminal 20C in this manner, it becomes possible to adjust a quality of the video game and/or a degree of difficulty of the video game in accordance with the information related to the user who participates in the event. For this reason, it becomes possible to improve interest in or the taste of the video game using real time communication. In this regard, the evaluation value may be configured so as to be calculated in accordance with a predetermined rule on the basis of the information regarding progress of the video game. For example, as examples of the configuration of the evaluation value, there are a score that each of the participating users obtains until the part is assigned, a current rank, and the like.

In this regard, it has not been mentioned particularly in the example of the fourth embodiment. However, the user terminal 20D may be configured so that a part according to a role of each of the participating users is assigned to the corresponding participating user. Namely, the user terminal 20D may be configured so as to control progress of the event in which the part assigned to each of the participating users in accordance with the role appears in the game field unique to each of the participating users on the basis of the role of each of the participating users. By configuring the user terminal 20D in this manner, it becomes possible to adjust a quality of the video game and/or a degree of difficulty of the video game in accordance with the information related to the user who participates in the event. For this reason, it becomes possible to improve interest in or the taste of the video game using real time communication. In this regard, the role means a so-called job or class that can be selected by the user to provide a characteristic to a status of a character.

In this regard, it has not been mentioned particularly in the example of the fourth embodiment. However, the user terminal 20D may be configured so as to: rank each of the participating users; and assign one of the parts according to a ranking to each of the participating users. Namely, the user terminal 20D may be configured so as to: rank each of the participating users; and control progress of the event in which the part assigned to each of the participating users in accordance with the ranking thereof appears in the game field unique to each of the participating user. By configuring the user terminal 20D in this manner, it becomes possible to adjust a quality of the video game and/or a degree of difficulty of the video game in accordance with the information related to the user who participates in the event. For this reason, it becomes possible to improve interest in or the taste of the video game using real time communication. In this regard, the user terminal 20D may be configured so that the ranking is carried out using the level value, the evaluation value, the role and the like.

In this regard, it has not been mentioned particularly in the example of the fourth embodiment. However, the system 100 may be configured so that the server 10 carries out the assigning process. Alternatively, the system 100 may be configured so that a host terminal in P2P environment carries out the assigning process.

Fifth Embodiment

Figure 12:
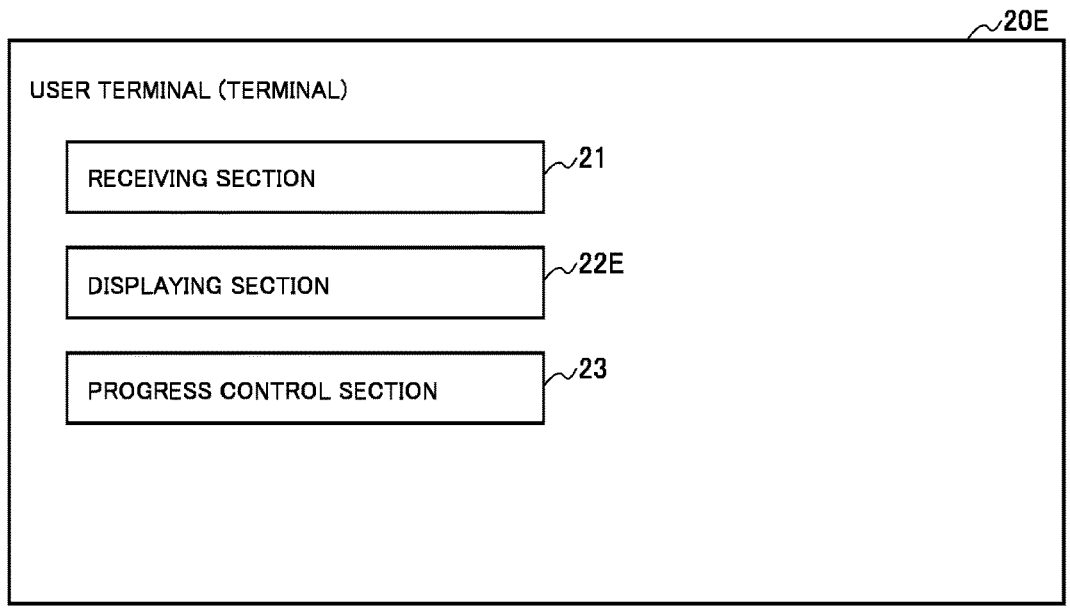
FIG. 12 is a block diagram showing a configuration of the user terminal corresponding to at least one of the embodiments according to the present invention.

FIG. 12 is a block diagram showing a configuration of a user terminal 20E (hereinafter, referred to as a "terminal 20E"), which is an example of the user terminal 20. In the present embodiment, the terminal 20E at least includes a receiving section 21, a displaying section 22E, and a progress control section 23.

The displaying section 22E has a function to display a game image that contains an image by which the user is caused to recognize that a part appears in a game field of other participating user.

Here, the configuration to cause the user to recognize that the part appears in the game field of other participating user is not limited particularly. However, it may be configured so as to cause the user to recognize it by means of text information. Alternatively, it may be configured so as to cause the user to recognize it using an additional frame image such as a small window.

Further, it is preferable that each of the parts is configured so as to be a part of an enemy character that is displayed in the game field unique to the participating user. The game field is assigned in the event in synchronization with the participating users.

Figure 13:
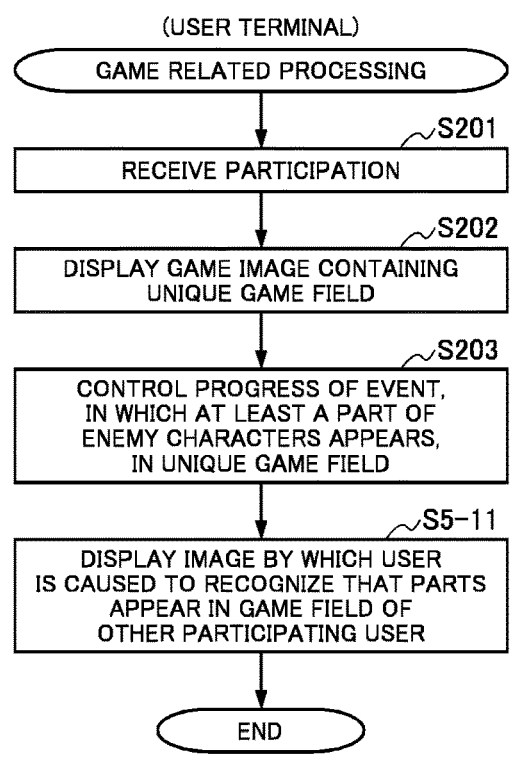
FIG. 13 is a flowchart showing an example of the game related processing corresponding to at least one of the embodiment to the present invention.

FIG. 13 is a flowchart showing an example of the game related processing carried out by the terminal 20. Hereinafter, an operation of the terminal 20E will be described as an example. In this regard, an operation of the terminal 20E together with the server 10 is omitted from a point of view to avoid repeated explanation.

When the terminal 20E controls progress of an event (Step S203), the terminal 20E causes the display device to display a game image that contains an image by which the user is caused to recognize that a part appears in a game field of other participating user in accordance with a progress status (Step S5-11). For example, in a case where the terminal 20S receives information, which means that the part appears in the game field of other participating user, from the server 10 during progress of the event, the terminal 20E causes the display device to display the game image that contains the image, by which the user is caused to recognize that the part appears in the game field of other participating user, on the display screen.

When the game image that contains the image by which the user is caused to recognize that the part appears in the game field of other participating user is displayed, the terminal 20E terminates the processing herein.

As explained above, as one side of the fifth embodiment, the user terminal 20E is configured so as to include the receiving section 21, the displaying section 22E, and the progress control section 23. Thus, the displaying section 22E displays the game image that contains the image by which the user is caused to recognize that at least a part of the enemy character appears in the game field of other participating user than the user of the participating users. Therefore, it becomes possible to cause the user to grasp that a part of an enemy character appears in the game field of any other participating user, and it becomes possible to improve interest in or the taste of the video game using real time communication.

Sixth Embodiment

In a sixth embodiment, an example of a video game, which is carried out by the system 100 according to the present embodiment, will be described in more detail.

(Outline of Video Game)

The video game according to the present embodiment is a virtual pinball game (or a shooting game) in which a battle proceeds by flicking a moving object to hit a target, which exists on a field, with the moving object. A P2P environment or a communication environment with a client-server system can be adopted. A specific game field is set up for the user, and a battle proceeds by hitting the moving object against an enemy character that is arranged within the game field. The user organizes a set of party from at least one game element (for example, a character), and causes an event (a fight against the enemy character) to proceed by means of the organized party.

(Outline of Moving Object)

The moving object used during an event corresponds to a character owned by the user. Therefore, the event proceeds by means of the moving object according to the character constituting the organized party. A parameter is set up for the character owned by the user. A level value, an offensive power, a defensive power, an HP, and the like are included in the parameter. This parameter influences on an ability of the moving object in a battle. Further, the moving object moves in the game field in accordance with a virtual gravity like a pinball game in which an enemy character is arranged. Further, the user hits the moving object against the enemy character, whereby it is possible to apply a damage to the enemy character.

(Outline of Enemy Character)

Similarly, a parameter is also set up for the enemy character. A level value, an offensive power, a defensive power, an HP, and the like are included in the parameter. The enemy character includes a normal character that is arranged in the game field in advance, and a boss character that appears in accordance with a predetermined rule. Each of the characters are arranged in the game field, and carries out an attack in accordance with a predetermined attack rule. As a configuration example of the attack by the enemy character, there is a configuration in which an attack object is displayed. When the moving object comes into contact with the displayed attack object, an HP of the moving object decreases.

(Game Image)

Figure 14:
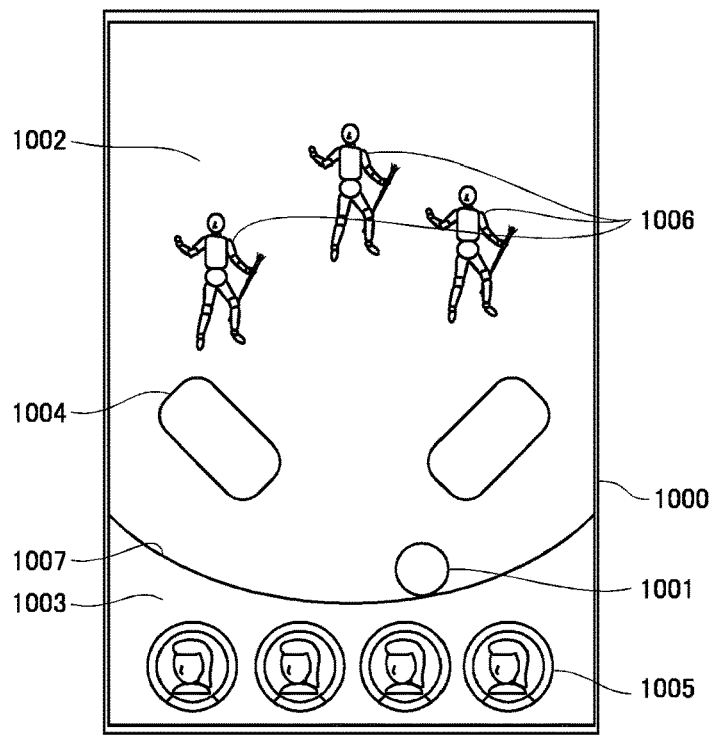
FIG. 14 is an explanatory drawing for explaining an example of a display screen corresponding to at least one of the embodiments according to the present invention.

FIG. 14 is an explanatory drawing for explaining an example of a display screen on which a game image is displayed. As shown in FIG. 14, a display screen 1000 contains a moving object 1001, a game field 1002, an operation object 1003, arrangement objects 1004 and 1006, player character information 1005, and a curved portion 1007. The arrangement objects include an arrangement object 1004 that is arranged as a purpose to variegate (or provide variety to) movement of the moving object, and an arrangement object 1006 (enemy character object) as an attack target of the moving object. The player character information 1005 is a region in which information such as an HP of a player character constituting a party is displayed.

(Game Field)

The game field 1002 is a region in which the moving object 1001 moves in accordance with virtual attractive force. Four sides of the game field 1002 is surrounded by a wall. The operation object 1003 is arranged in the game field 1002 according to the present embodiment as the wall of a direction in which the attractive force works of the four walls that surround the game field 1002. In the present embodiment, the attractive force works in a downward direction of the display screen 1000. The lower wall is used as the operation object 1003. Further, such a phenomenon that the moving object moves in accordance with a gravity like an actual pinball is reproduced.

(Operation Object)

The operation object 1003 plays a role as a flipper in a general pinball game. For that reason, the operation object 1003 operates so as to move upward or downward in response to an operational input of the user. A scene (or appearance) in which the moving object 1001 is flicked out from the operation object 1003, is reproduced in response to the operation. Further, the operation object 1003 contains the curved portion 1007 having a convex portion in a direction of an attractive force (that is, a predetermined portion of the operation object). In the present embodiment, the curved portion 1007 having a downwardly convex portion is constituted. For that reason, the moving object 1001 does not fall outside the game field 1002. The operation object may be configured so that openings, each of which has a size through which the moving object 1001 does not fall down, are formed intermittently.

(Arrangement Object)

The arrangement object 1004 is a virtual object that flicks the moving object 1001 when the virtual object comes into contact with the moving object 1001 (which is equivalent to a so-called slingshot and jet bumper in a pinball game).

(Action Modes of Moving Object)

Types of operation controls of a moving object are roughly classified into three types (including a first action control, a second action control, and a third action control). The first action control is a control when the moving object moves within a game field. The second action control is a control when the moving object is flicked out from an operation object. The third action control is a control when the moving object stops on the operation object.

(First Action Control)

In the first action control, an action of the moving object is controlled so as to move in accordance with a virtual attractive force in the game field. The moving object then finally stops (or completely lands on the curved portion while the movement is influenced by an arrangement object or an enemy character in the game field, and a contact with an attack from the enemy character. More specifically, the moving object lands on the curved portion. A rebound of the moving object becomes smaller gradually in accordance with the attractive force and a repulsive force until the moving object stops at the curved portion (that is, on the curved portion). The moving object finally becomes a stopped state.

(Second Action Control)

Figure 15:
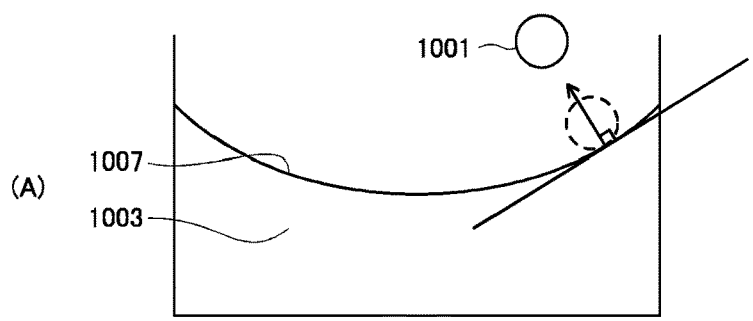
FIG. 15 is an explanatory drawing for explaining an example of an action of a movable object corresponding to at least one of the embodiments according to the present invention.
Figure 15:
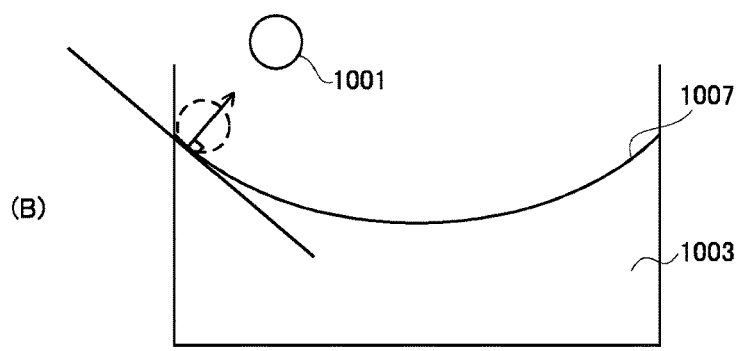

In a case where an input is received from the user while the moving object moves on the curved portion, an action of the moving object is controlled in a movement mode determined in accordance with the input. FIG. 15 is an explanatory drawing for explaining an example of the action of the moving object that moves by means of a second action control. As shown in FIG. 15, an action of the moving object 1001 is controlled by the second action control so as to be flicked (or forced) out from the operation object 1003. An angle of flicking out at this time is based on a contact position between the moving object and the curved portion 1007 at the time to receive the input. More specifically, as shown in FIGS. 15A and 15B, in the present embodiment, an action of the moving object 1001 is controlled so as to be flicked out toward a direction perpendicular to a tangential line of the contact point between the curved portion 1007 and the moving object 1001 (and toward a direction of the game field 1002). In this regard, it is preferable that the system 100 is configured so that, when the moving object 1001 is positioned within a predetermined range from the curved portion 1007 (that is, when the moving object 1001 does not completely stop but a distance from the curved portion 1007 is small) and the user carries out an input at that time, the action of the moving object 1001 is controlled so that the moving object 1001 is flicked out. Further, the system 100 is configured so that a special control is added to the action of the moving object 1001 in a case where the input of the user is a flick input. For example, the moving object 1001 is curved in accordance with a direction of the flick input after the moving object 1001 is flicked out.

(Third Action Control)

Figure 16:
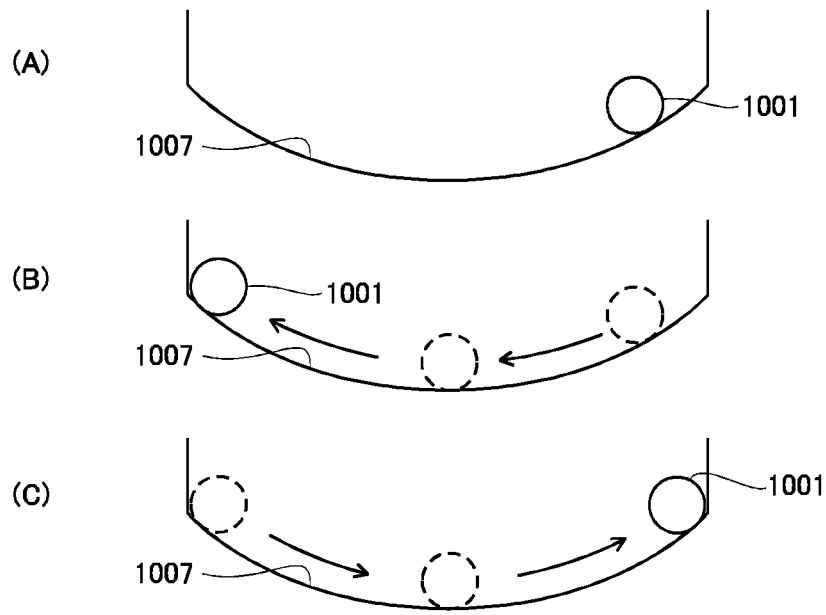
FIG. 16 is an explanatory drawing for explaining an example of an action of the movable object corresponding to at least one of the embodiments according to the present invention.

When a moving object comes into contact with a curved portion (in the present embodiment, after the moving object stopped on the curved portion), the moving object moves on the curved portion in accordance with a predetermined movement rule. FIG. 16 is an explanatory drawing for explaining an example of an action of the moving object that moves by means of a third action control. As shown in FIGS. 16A to 16C, the moving object 1001 moves on the curved portion 1007 by means of the third action control like a pendulum. The system 100 may be configured so that the movement on the curved portion 1007 is different from each other for every moving object 1001. Namely, the system 100 may be configured so that the movement mode on the curved portion 1007 of the moving object 1001 is different from each other in accordance with a character selected by the user and corresponding to the moving object 1001. As examples of the configuration of the movement mode, there are a move speed, a movement rule (for example, a rule to move so as to rebound or jump), and the like.

(Outline of Event)

As a flow of an event, the user first selects an event. Enemy characters corresponding to the selected event in turn appear in the game field. This event may be configured so as to be a so-called stage system that is constituted by a plurality of stages and in which a final boss character appears on a final stage. In an event that can be carried out by a multi-play system, by constituting a party by users each of who carries out a participation request, an event, in which an operation result of each of the participating users who participate in the event is displayed on the display screen of the user terminal of each of the participating users in synchronization with the participating users, is started.

(Boss Character)

Figure 17:
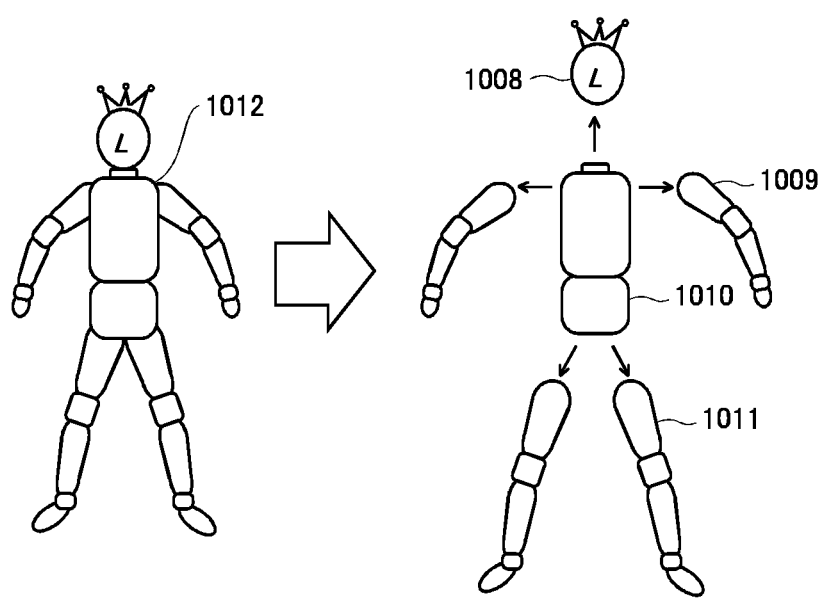
FIG. 17 is an explanatory drawing for explaining an outline of a boss character corresponding to at least one of the embodiments according to the present invention.

A boss character is divided into a plurality of parts. FIG. 17 is an explanatory drawing for explaining an outline of the boss character. As shown in FIG. 17, a boss character 1012 according to the present embodiment contains a head part 1008, an arm part 1009, a body part 1010, and a foot part 1011. The parts 1008 to 1011 of the boss character 1012 appear in a game field of at least any user of the participating users. The user hits any of the displayed parts with the moving object, whereby it is possible to apply a damage to the boss character. At this time, it may be configured so as to display to which participating user the part appears in the game field.

The system 100 according to the sixth embodiment includes the server 10 and the plurality of user terminals 20, 201 to 20N, whereby various kinds of functions for carrying out various kinds of processes in response to an operation of the user are realized. In particular, in the present embodiment, the following explanation will be made using a server 10Z, which is one example of the server 10, a user terminal 20Z (hereinafter, referred to as a "terminal 20Z"), which is one example of each of the user terminal 20, 201 to 20N, a user terminal 2012 (hereinafter, referred to as a "terminal 201Z"), and a user terminal 202Z (hereinafter, referred to as a "terminal 202Z") as an example.

Figure 18:
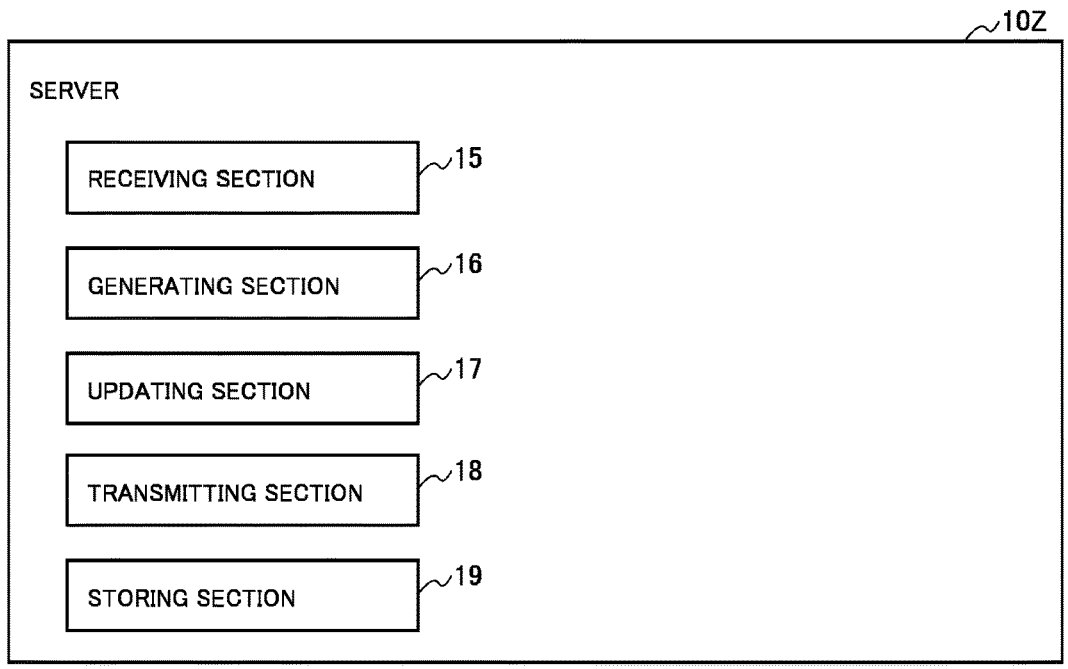
FIG. 18 is a block diagram showing a configuration of the server corresponding to at least one of the embodiments according to the present invention.

FIG. 18 is a block diagram showing an example of a configuration of the server 10Z.

The server 10Z at least includes a receiving section 15, a generating section 16, an updating section 17, a transmitting section 18, and a storing section 19.

The receiving section 15 has a function to receive a participation request from each of the terminals 20, 201 to 20N. The participation request is used for a request to participate in an event using a moving object. At least one boss character appears in the event. In the present embodiment, the server 10Z receives a participation request for requesting to participate in the event from any of the terminal 20Z, the terminal 201Z, and the terminal 202Z. Therefore, the following explanation will be made using a user U1 of the terminal 20Z, a user U2 of the terminal 201Z, and a user U3 of the terminal 202Z as participating users.

Here, the boss character means a special character of enemy characters. Here, in order to distinguish between a normal enemy character and the special enemy character, the special character is called as the boss character as a matter of convenience. The boss character according to the present embodiment is constructed by a plurality of parts. For example, the parts are divided into a head, a body, a hand, and a foot. Further, the parts may be configured so as to include sub-parts obtained by further subdividing each of the divided parts.

Further, it is preferable that the boss character is configured so that a status of the boss character, which includes an HP, is set up. Moreover, it is preferable that the status is configured so as to be set up for each of the parts. In this regard, it is preferable that the information regarding the boss character is stored in a predetermined storage region. Further, it is preferable that this information regarding the boss character is updated in accordance with progress of the video game. Moreover, it is preferable that the information regarding the boss character is configured so as to contain identification information for uniquely specifying the corresponding event in addition to the HP and an offensive power.

Further, the receiving section 15 has a function to receive information regarding an operation result of the user from each of the terminals 20, 201 to 20N (hereinafter, referred to as "operation result information"). In particular, in the present embodiment, the receiving section 15 receives the operation result information from each of the terminal 20Z, the terminal 201Z, and the terminal 202Z, which participate in the event. In this regard, the configuration of the operation result information is not limited particularly. However, in the present embodiment, the receiving section 15 receives a result of progress of the event controlled at the terminal side as the operation result information. The receiving section 15 may be configured so as to receive an input for a predetermined frame as the operation result information.

The generating section 16 has a function to generate appearance information for causing parts of enemy character to appear in a game field of at least one user of participating users. Here, the appearance information is configured so as to contain parts information regarding an appearance portion of the boss character and appearance user information that means each of the participating users who causes a display device to display the appearance portion. The generating section 16 refers to the event information and the user information stored in the storing section 19, and generates appearance information in accordance with a predetermined rule.

Here, the predetermined rule means a rule that is defined in advance. The predetermined rule according to the present embodiment includes a rule regarding timing to generate, and a rule when parts are assigned to participating users. As examples of the configuration of the rule regarding the timing to generate, there are a configuration in which the timing is when a predetermined time elapses since the event is started, a configuration in which the timing is when an HP of the boss character becomes a predetermined value, and the like. On the other hand, as examples of the configuration of the rule when the part is assigned to each of the participating users, there are a configuration in which the parts are respectively assigned to the participating users in the decreasing order of the levels of the users, a configuration in which a part is assigned to the participating user whose HP is high, a configuration in which the parts are respectively assigned to the participating users at random, a configuration in which the parts are respectively assigned to the participating users in the participating order, and the like.

The updating section 17 has a function to update the event information and the user information stored in the storing section 19 on the basis of the received operation result information.

The transmitting section 18 has a function to refer to the appearance information, and to transmit the parts information to a terminal of each of the participating users corresponding to the appearance user information. In this regard, the transmitting section 18 may be configured so as to transmit the appearance information to the terminals of all of the participating users. Further, the transmitting section 18 has a function to transmit start instruction information for instructing start of the event to the terminal of each of the participating users.

The storing section 19 is a storage medium for storing the event information that contains information regarding an enemy character. An event ID for uniquely specifying an event, an enemy character ID for uniquely specifying an enemy character including the boss character, various kinds of parameters for the enemy character, various kinds of parameters for each of the parts of the boss character, and the like are contained in the event information. The event information is appropriately updated by the updating section 17.

Further, the storing section 19 is a storage medium for storing the user information of each of the participating users. Overall information related to the user, such as a level, an HP, and an evaluation value of the user, is contained in the user information. The user information is appropriately updated by the updating section 17.

Figure 19:
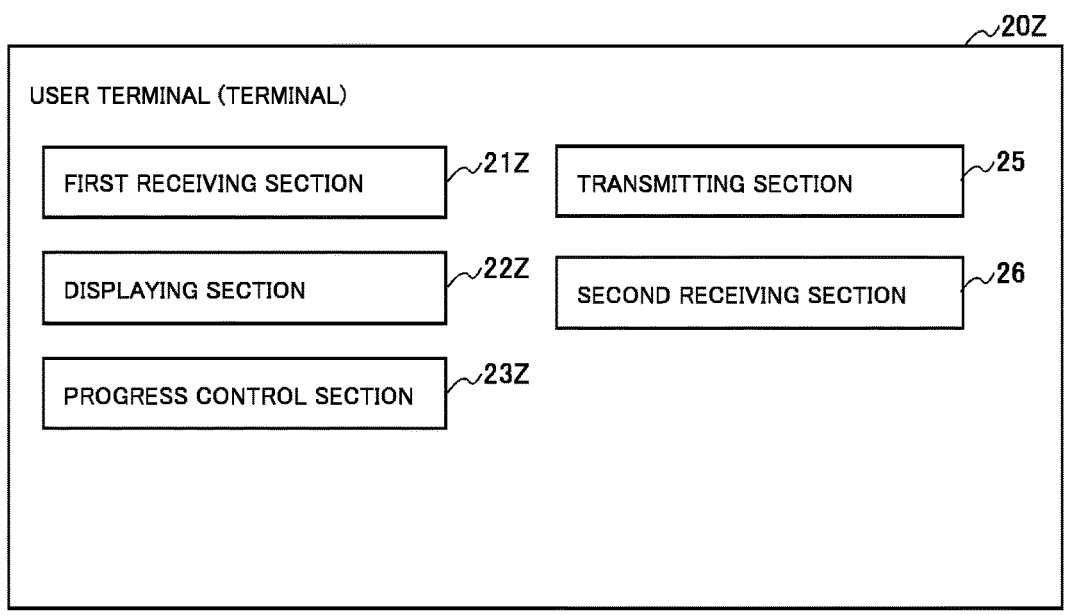
FIG. 19 is a block diagram showing a configuration of the user terminal corresponding to at least one of the embodiments according to the present invention.

FIG. 19 is a block diagram showing an example of a configuration of the terminal 20Z. In this regard, the terminal 2012 and the terminal 202Z has the same configuration as that of the terminal 20Z. Thus, its explanation will be omitted.

In the present embodiment, the terminal 20Z at least includes a first receiving section 21Z, a displaying section 22Z, a progress control section 23Z, a transmitting section 25, and a second receiving section 26.

The first receiving section 21Z has a function to receive a participation request in an event from the user U1 of the terminal 20Z. The received participation request is transmitted to the server 10Z.

The displaying section 22Z has a function to cause a display device to display a game image containing a game field unique to the user on a display screen. Further, the displaying section 22Z has a function to refer to the parts information to display the game image containing the game field in which parts are arranged.

The progress control section 23Z has a function to control progress of an event in accordance with an input of the user. Further, the progress control section 23Z has a function to control progress of the event that proceeds so that the part appears in the game field unique to the user of the terminal, which receives the parts information, in a case where the parts information is received.

The transmitting section 25 is a transmitting section of the terminal side, and has a function to transmit the participation request to the server 10Z. Further, the transmitting section 25 has a function to transmit a result of progress of the event controlled by the progress control section 23Z to the server 10Z.

The second receiving section 26 is a receiving section of the terminal side, and has a function to receive the parts information from the server 10Z. Further, the second receiving section 26 has a function to receive the start instruction information from the server 10Z.

Figure 20:
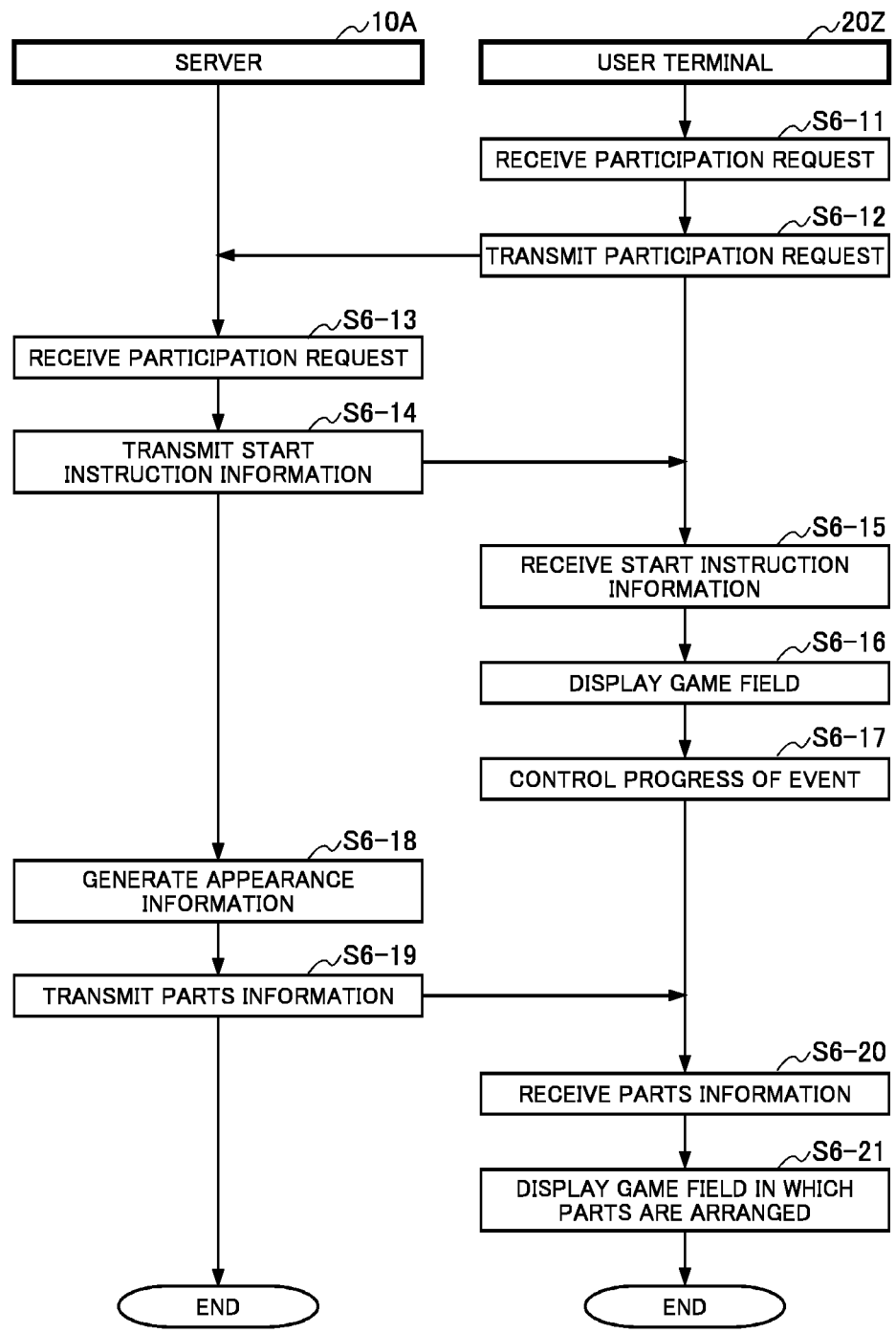
FIG. 20 is a flowchart showing an example of the game related processing corresponding to at least one of the embodiments according to the present invention.

FIG. 20 is a flowchart showing an example of the game related processing carried out by the system 100. Hereinafter, an operation of each of the server 10Z and the terminal 20Z will be described as an example. The following explanation will be made so that a game image is displayed on the display screen of the display device at fixed intervals in accordance with progress of the video game.

In the game related processing, the terminal 20Z first receives a request to participate in an event (hereinafter, referred to as a "participation request") from the user U1 (Step S6-11).

Subsequently, the terminal 20Z transmits the participation request to the server 10Z (Step S6-12).

When the participation request is received (Step S6-13), the server 10Z determines the participating user, and transmits start instruction information for instructing start of an event to a terminal of each of the participating users (Step S6-14). Detailed explanation is not made particularly in the present embodiment. However, the server 10Z receives a participation request from each of the terminals 20, 201 to 20N; carries out matching of the users; and determines participating users who participate in one event. In the present embodiment, the user U2 of the terminal 201Z and the user U3 of the terminal 202Z are determined as the participating users in addition to the user U1.

When the start instruction information is received (Step S6-15), the terminal 20Z causes the display device to display a game image containing a game field on the display screen (Step S6-16).

When the game image is displayed, the terminal 20Z controls progress of the event in the game field (H6-17). This game field is unique to the user U1. For that reason, when viewed from a viewpoint of the system 100, one event proceeds in synchronization with in a game field unique to the user U1, a game field unique to the user U2, and a game field unique to the user U3 who are the participating users.

When the event then proceeds, the server 10Z generates appearance information in accordance with a predetermined rule (Step S6-18). Here, for example, the server 10Z generates the appearance information for causing the terminal 20Z of the user U1 to appear the head part 1008, causing the user terminal 201Z of the user U2 to appear the body part 1010, and causing the user terminal 202Z of the user U3 to appear the foot part 1011.

When the appearance information is generated, the server 10Z transmits, to the terminal 20Z, parts information contained in the appearance information (Step S6-19). For example, the server 10Z transmits parts information regarding the head part 1008 to the terminal 20Z; transmits parts information regarding the body part 1010 to the terminal 2012; and transmits parts information regarding the foot part 1011 to the terminal 202Z.

When the terminal 20Z receives the parts information (Step S6-20), the terminal 20Z causes the display device to display the game image, which contains the game field in which the parts are arranged on the basis of the received parts information, on the display screen (Step S6-21).

FIG. 21 is an explanatory drawing showing an example of the display screen on which parts are displayed in each of the terminals 20Z, 201Z and 202Z. In particular, FIG. 21A shows an example of the display screen included in the terminal 20Z, FIG. 21B shows an example of the display screen included in the terminal 201Z, and FIG. 21C shows an example of the display screen included in the terminal 202Z. As shown in FIGS. 21A to 21C, the head part 1008 is displayed on a display screen 1100 of the terminal 20Z, the body part 1010 is displayed on a display screen 1200 of the terminal 2012, and the foot part 1011 is displayed on a display screen 1300 of the terminal 202Z. In addition, the game image regarding the event that is synchronized among the respective terminals 20Z, 201Z and 202Z is displayed on the display screen of the display device included in each of the terminals 20Z, 201Z and 202Z.

When the game image containing the game field in which the part is arranged is displayed, the system 100 according to the present embodiment terminates the processing herein.

As explained above, as one side of the sixth embodiment, the terminal 20Z for controlling progress of the video game is configured so as to include the first receiving section 21Z, the displaying section 22Z, and the progress control section 23Z. Thus, the first receiving section 21Z receives the participation of the user of the terminal 20Z in the event that the plurality of users are allowed to participate in and proceeds in synchronization with the participating users who participate in the event; the displaying section 22Z causes the display device of the terminal 20Z to display the game image containing the game field unique to each of the participating users; and the progress control section 23Z controls progress of the event in which at least a part of the enemy character, which is associated with the event, appears in the game field unique to at least one user of the participating users, and controls progress of the event in the game field unique to the user in accordance with an input of the user. Therefore, it is possible to improve interest in or the taste of the video game using real time communication.

Namely, as one side of the sixth embodiment, at least apart of the enemy character is displayed on the display device of the user terminal of any one participating user of the participating users. For this reason, it becomes possible to improve the degree of importance (or priority) of play of each of the participating users in a form that has not been around until now. For this reason, it becomes possible to improve interest in or the taste of the video game using real time communication. Further, as one side of the first embodiment, it becomes possible to apply a different status to each of the users in real time while causing each of the users to share a common event game in real time. For this reason, it becomes possible to improve interest in or the taste of the video game using real time communication.

Further, as one side of the sixth embodiment described above, user the terminal 20Z is configured so as to include the first receiving section 21Z, the displaying section 22Z, and the progress control section 23Z. Thus, the progress control section 23Z controls progress of the event in which at least apart of the enemy character that is a portion assigned to each of the participating users on the basis of the user information of each of the participating users appears in the game field unique to each of the participating users. Therefore, it becomes possible to adjust a quality of the video game and/or a degree of difficulty of the video game in accordance with the information related to the user who participates in the event. For this reason, it becomes possible to improve interest in or the taste of the video game using real time communication.

In this regard, it has not been mentioned particularly in the example of the sixth embodiment described above. However, the terminal 20Z may be configured so as to display the game field unique to the user for which display restriction of a moving object operated by other participating user of the participating users than the user is imposed. Further, it has not been mentioned particularly in the example of the fourth embodiment described above. However, the terminal 20Z may be configured so as to release the display restriction in a case where a predetermined condition is satisfied.

In this regard, it has not been mentioned particularly in the example of the sixth embodiment described above. However, the terminal 20Z may be configured so as to display a game image containing an image by which the user is caused to recognize that at least apart of the enemy character appears in a game field of other participating user than the user of the participating users. In this case, for example, the terminal 20Z may be configured so as to: receive the appearance information; and display the game image on the basis of the received appearance information.

As explained above, one or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, 201 to 20N and the server 10 carries out the various kinds of processing described above in accordance with various kinds of control programs (for example, a video game processing program) stored in the storage device with which the corresponding terminal or server is provided.

Further, the configuration of the system 100 is not limited to the configuration that has been explained as an example of each of the embodiments described above. For example, the system 100 may be configured so that the server 10 carries out a part or all of the processes that have been explained as the processes carried out by the user terminal. Alternatively, the system 100 may be configured so that any of the plurality of user terminals 20, 201 to 20N (for example, the user terminal 20) carries out apart or all of the processes that have been explained as the processes carried out by the server 10. Further, the system 100 may be configured so that a part or all of the storing sections included in the server 10 is included in any of the plurality of user terminals 20, 201 to 20N. Namely, the system 100 may be configured so that a part or all of the functions of any one of the user terminal 20 and the server 10 according to the system 100 is included in the other.

Further, the program product may be configured so as to cause a single apparatus that does not include a communication network to realize a part or all of the functions that have been explained as the examples of the respective embodiments described above.

APPENDIX

The explanation of the embodiments described above has been described so that the following inventions can be at least realized by a person having a normal skill in the art to which the present invention belongs.

(1)

A non-transitory computer-readable medium including a program product for causing a user terminal to realize functions to control progress of a video game, wherein the functions include:

a receiving function configured to receive participation of a user of the user terminal in an event, a plurality of users being allowed to participate in the event, the event proceeding in synchronization with participating users who participate in the event;

a displaying function configured to cause the user terminal to display a game image, the game image containing a game field unique to the user; and a progress controlling function configured to control progress of the event in which at least a part of an enemy character appears in a game field unique to at least one user of the participating users, the enemy character being associated with the event, the progress controlling function being configured to control progress of the event in the game field unique to the user in accordance with an input of the user.

(1-1)

The non-transitory computer-readable medium according to claim (1), wherein the functions further include:

a generating function configured to generate appearance information for causing at least a part of the enemy character to appear in a game field of at least one user of the participating users, the enemy character being associated with the event, and wherein the progress controlling function includes a function configured to control progress of the event on the basis of the appearance information.

(1-2)

The non-transitory computer-readable medium according to claim (1), wherein the functions further include:

a generating function configured to generate appearance information in accordance with a predetermined rule, the appearance information containing parts information and appearance user information, the parts information being related to an appearance portion of the enemy character, the appearance user information meaning the participating user who causes the user terminal to display the appearance portion; and a transmitting function configured to transmit the parts information to a terminal of the participating user indicated by the appearance user information.

(1-3)

The non-transitory computer-readable medium according to claim (1-1) or (1-2), wherein the functions further include:

a receiving function configured to receive operation result information of other participating user from the corresponding terminal of the other participating user;

a storing function configured to store event information in a predetermined storage region, the event information containing information regarding the enemy character; and an updating function configured to refer to the input of the user and the operation result information to update the event information, and wherein the generating function includes a function configured to refer to the updated event information to generate the appearance information.

(2)

The non-transitory computer-readable medium according to claim (1), wherein the displaying function includes a function configured to display the game field unique to the user for which display restriction of a moving object operated by other participating user of the participating users than the user is imposed.

(3)

The non-transitory computer-readable medium according to claim (2), wherein the functions further include:

a releasing function configured to release the display restriction in a case where a predetermined condition is satisfied.

(4)

The non-transitory computer-readable medium according to any one of claims (1) to (3), wherein the progress controlling function includes a function configured to control the progress of the event on the basis of user information of each of the participating users so that at least a part of the enemy character appears in a game field unique to each of the participating users, the part being a portion assigned to each of the participating users.

(4-1)

The non-transitory computer-readable medium according to any one of claims (1) to (3), wherein the progress controlling function includes a function configured to control progress of the event on the basis of a level value of each of the participating users so that at least a part of the enemy character appears in a game field unique to each of the participating users, the part being a portion that is assigned to each of the participating users in accordance with the level value.

(4-2)

The non-transitory computer-readable medium according to any one of claims (1) to (3), wherein the progress controlling function includes a function configured to control progress of the event on the basis of an evaluation value of each of the participating users so that at least a part of the enemy character appears in a game field unique to each of the participating users, the part being a portion that is assigned to each of the participating users in accordance with the evaluation value.

(4-3)

The non-transitory computer-readable medium according to any one of claims (1) to (3), wherein the progress controlling function includes a function configured to control progress of the event on the basis of a roll of each of the participating users so that at least a part of the enemy character appears in a game field unique to each of the participating users, the part being a portion that is assigned to each of the participating users in accordance with the role.

(4-4)

The non-transitory computer-readable medium according to any one of claims (1) to (3), wherein the progress controlling function includes a function configured to rank the participating users on the basis of a predetermined rule, and to control progress of the event in which at least a part of the enemy character appears in a game field unique to each of the participating users, the part being assigned to each of the participating user in accordance with a ranking thereof.

(5)

The non-transitory computer-readable medium according to any one of claims (1) to (4), wherein the displaying function includes a function configured to display the game image containing an image by which the user is caused to recognize that at least the part of the enemy character appears in a game field of another participating user of the participating users than the user.

(6)

A non-transitory computer-readable medium including a program product for causing a server to realize at least one function of the functions that the program product described in any one of claims (1) to (5) causes the user terminal to realize, the server being capable of communicating with the user terminal.

(7)

A computer into which the program product contained in the non-transitory computer-readable medium according to any one of claims (1) to (6) is installed.

(8)

A system for controlling progress of a video game, the system comprising a communication network, a server, and a user terminal, the system comprising:

a receiving section configured to receive participation of a user of the user terminal in an event, a plurality of users being allowed to participate in the event, the event proceeding in synchronization with participating users who participate in the event;

a displaying section configured to cause the user terminal to display a game image, the game image containing a game field unique to the user; and a progress control section configured to control progress of the event in which at least a part of an enemy character appears in a game field unique to at least one user of the participating users, the enemy character being associated with the event, the progress control section being configured to control progress of the event in the game field unique to the user in accordance with an input of the user.

(9)

The system according to claim (8), wherein the server includes the receiving section, and the progress control section, and wherein the user terminal includes:

a receiving section configured to receive information for displaying the game image from the server; and the displaying section.

(10)

A non-transitory computer-readable medium including a program product for causing a server to realize functions to control progress of a video game, wherein the functions include:

a receiving function configured to receive participation of a user of a user terminal in an event, a plurality of users being allowed to participate in the event, the event proceeding in synchronization with participating users who participate in the event;

a displaying function configured to cause the user terminal to display a game image, the game image containing a game field unique to the user; and a progress controlling function configured to control progress of the event in which at least a part of an enemy character appears in a game field unique to at least one user of the participating users, the enemy character being associated with the event, the progress controlling function being configured to control progress of the event in the game field unique to the user in accordance with an input of the user.

(11)

A non-transitory computer-readable medium including a program product for causing a user terminal to realize functions to control progress of a video game, wherein a server includes:

a receiving function configured to receive participation of a user of the user terminal in an event, a plurality of users being allowed to participate in the event, the event proceeding in synchronization with participating users who participate in the event;

a displaying function configured to cause the user terminal to display a game image, the game image containing a game field unique to the user; and a progress controlling function configured to control progress of the event in which at least a part of an enemy character appears in a game field unique to at least one user of the participating users, the enemy character being associated with the event, the progress controlling function being configured to control progress of the event in the game field unique to the user in accordance with an input of the user, and wherein the functions include:

a receiving function configured to receive, from the server, information regarding the functions included in the server; and an inputting/outputting function configured to carry out an input or an output corresponding to the functions of the server.

(12)

A non-transitory computer-readable medium including a program product for causing a user terminal to realize at least one function of the functions that the program product described in claim (11) causes the server to realize, the user terminal being capable of communicating with the server.

(13)

A server into which the program product contained in the non-transitory computer-readable medium according to claim (11) is installed.

(14)

A method of controlling progress of a video game, the method comprising:

a displaying process configured to receive participation of a user of a user terminal in an event, a plurality of users being allowed to participate in the event, the event proceeding in synchronization with participating users who participate in the event;

a displaying process configured to cause the user terminal to display a game image, the game image containing a game field unique to the user; and a progress controlling process configured to control progress of the event in which at least a part of an enemy character appears in a game field unique to at least one user of the participating users, the enemy character being associated with the event, the progress controlling process being configured to control progress of the event in the game field unique to the user in accordance with an input of the user.

(15)

A method of controlling progress of a video game by a system, the system comprising a communication network, a server, and a user terminal, the method comprising:

a displaying process configured to receive participation of a user of a user terminal in an event, a plurality of users being allowed to participate in the event, the event proceeding in synchronization with participating users who participate in the event;

a displaying process configured to cause the user terminal to display a game image, the game image containing a game field unique to the user; and a progress controlling process configured to control progress of the event in which at least a part of an enemy character appears in a game field unique to at least one user of the participating users, the enemy character being associated with the event, the progress controlling process being configured to control progress of the event in the game field unique to the user in accordance with an input of the user.

(16) A non-transitory computer-readable medium including a program product for causing a server to realize functions to control progress of a video game, wherein the functions include:

a progress controlling function configured to control progress of one game event, participating users participating in the one game event, the one game event proceeding in synchronization with the participating users using a game field unique to each of the participating users; and a displaying function configured to cause a user terminal owned by each of the participating users to display an image by which each of the participating users is caused to recognize progress of the one game event.

According to one of the embodiments of the present invention, it is useful for a video game using real time communication.

What is claimed is:

1. A non-transitory computer-readable medium including a program product for causing a user terminal to realize functions to control progress of a video game, the functions including:

a receiving function configured to receive participation of a user of the user terminal in an event, a plurality of users being allowed to participate in the event, the event proceeding in synchronization with participating users that participate in the event;

a displaying function configured to cause the user terminal to display a game image, the game image containing a game field unique to the user terminal; and a progress controlling function configured to control progress of the event in which at least a part of an enemy character appears in a game field unique to at least one user of the participating users, the enemy character being associated with the event, the progress controlling function being configured to control progress of the event in the game field unique to the user in accordance with an input of the user, wherein a different part of the enemy character appears in each of game fields unique to at least two of the participating users.

2. The non-transitory computer-readable medium according to claim 1, wherein the displaying function includes a function configured to display the game field unique to the user for which display restriction of a moving object operated by a second user of the participating users, other than the user, is imposed.

3. The non-transitory computer-readable medium according to claim 2, wherein the functions further include:

a releasing function configured to release the display restriction in a case where a predetermined condition is satisfied.

4. The non-transitory computer-readable medium according to claim 1, wherein the progress controlling function is configured to control the progress of the event on a basis of user information of each of the participating users so that at least a part of the enemy character appears in a game field unique to each of the participating users, the part being a portion assigned to each of the participating users.

5. The non-transitory computer-readable medium according to claim 1, wherein the displaying function is further configured to display the game image containing an image by which the user terminal indicates that at least the part of the enemy character appears in a game field of another user terminal.

6. The non-transitory computer-readable medium according to claim 1, wherein the functions further include:

a generating function configured to generate appearance information for causing the part of the enemy character to appear in the game field of the user of the participating users, and wherein the progress controlling function is configured to control the progress of the event on a basis of the appearance information.

7. The non-transitory computer-readable medium according to claim 1, wherein the functions further include:

a generating function configured to generate appearance information in accordance with a predetermined rule, the appearance information containing parts information and appearance user information, the parts information being related to an appearance portion of the enemy character, the appearance user information indicating one of the participating users that causes the user terminal to display the appearance portion; and a transmitting function configured to transmit the parts information to a terminal of the one of the participating users indicated by the appearance user information.

8. The non-transitory computer-readable medium according to claim 6, wherein the functions further include:

a receiving function configured to receive operation result information of a second user of the participating users from a corresponding terminal of the second user;

a storing function configured to store event information in a predetermined storage region, the event information containing information regarding the enemy character; and an updating function configured to refer to the input of the user and the operation result information to update the event information, and wherein the generating function is configured to refer to the updated event information to generate the appearance information.

9. The non-transitory computer-readable medium according to claim 1, wherein the progress controlling function is configured to control the progress of the event on a basis of a level value of each of the participating users so that at least a part of the enemy character appears in a game field unique to each of the participating users, the part being a portion that is assigned to each of the participating users in accordance with the level value.

10. The non-transitory computer-readable medium according to claim 1,
wherein the progress controlling function is configured to control the progress of the event on a basis of an evaluation value of each of the participating users so that at least a part of the enemy character appears in a game field unique to each of the participating users, the part being a portion that is assigned to each of the participating users in accordance with the evaluation value.

11. The non-transitory computer-readable medium according to claim 1,
wherein the progress controlling function is configured to control the progress of the event on a basis of a role of each of the participating users so that at least a part of the enemy character appears in a game field unique to each of the participating users, the part being a portion that is assigned to each of the participating users in accordance with the role.

12. The non-transitory computer-readable medium according to claim 1,
wherein the progress controlling function is further configured to rank the participating users on a basis of a predetermined rule, and to control the progress of the event in which at least a part of the enemy character appears in a game field unique to each of the participating users, the part being assigned to each of the participating users in accordance with the rank.

13. A system for controlling progress of a video game, the system comprising:
a communication network;
a server; and
a user terminal,
wherein at least one of the server or the user terminal is configured to receive participation of a user of the user terminal in an event, a plurality of users being allowed to participate in the event, the event proceeding in synchronization with participating users that participate in the event;
at least one of the server or the user terminal is configured to cause the user terminal to display a game image, the game image containing a game field unique to the user terminal; and
at least one of the server or the user terminal is configured to control progress of the event in which at least a part of an enemy character appears in a game field unique to at least one user of the participating users, the enemy character being associated with the event, the progress of the event in the game field unique to the user being controlled in accordance with an input of the user,
wherein a different part of the enemy character appears in each of game fields unique to at least two of the participating users.

14. A non-transitory computer-readable medium including a program product for causing a server to realize functions to control progress of a video game, the functions including:
a receiving function configured to receive participation of a user of a user terminal in an event, a plurality of users being allowed to participate in the event, the event proceeding in synchronization with participating users that participate in the event;
a displaying function configured to cause the user terminal to display a game image, the game image containing a game field unique to the user terminal; and
a progress controlling function configured to control progress of the event in which at least a part of an enemy character appears in a game field unique to at least one user of the participating users, the enemy character being associated with the event, the progress controlling function being configured to control progress of the event in the game field unique to the user in accordance with an input of the user,
wherein a different part of the enemy character appears in each of game fields unique to at least two of the participating users.

* * * * *